(12) United States Patent
Marsili

(10) Patent No.: US 7,340,224 B2
(45) Date of Patent: Mar. 4, 2008

(54) DEVICES FOR REDUCING THE DYNAMIC RANGE OF SIGNALS IN TRANSMITTERS OF COMMUNICATION SYSTEMS

(75) Inventor: Stefano Marsili, Fuernitz (AT)

(73) Assignee: Infineon Technologies AG, Munich (DE)

( * ) Notice: Subject to any disclaimer, the term of this patent is extended or adjusted under 35 U.S.C. 154(b) by 400 days.

(21) Appl. No.: 11/175,883

(22) Filed: Jul. 6, 2005

(65) Prior Publication Data

US 2006/0014500 A1 Jan. 19, 2006

(30) Foreign Application Priority Data

Jul. 6, 2004 (DE) .................. 10 2004 032 667

(51) Int. Cl.
*H04B 1/68* (2006.01)
(52) U.S. Cl. .................. 455/114.1; 455/116; 375/296
(58) Field of Classification Search .................. None
See application file for complete search history.

(56) References Cited

U.S. PATENT DOCUMENTS

| 6,597,746 B1 | 7/2003 | Amrany et al. | |
| 6,925,113 B2 * | 8/2005 | Kim et al. | 375/227 |
| 2004/0170227 A1 * | 9/2004 | Frank et al. | 375/260 |
| 2005/0186920 A1 * | 8/2005 | Staszewski et al. | 455/114.1 |

FOREIGN PATENT DOCUMENTS

| DE | 102 55 687 A1 | 6/2004 |
| WO | WO 99/53625 A1 | 10/1999 |

OTHER PUBLICATIONS

"Multi-Carrier WCDMA Basestation Design Considerations—Amplifier Linearization and Crest Factor Control", Technology White Paper, Andrew Wright and Oliver Nesper, PMC Sierra Inc., Issue 1: Aug. 2002, 35 pgs.
"Reducing the Peak-To-Average Power Ratio in OFDM Radio Transmission Systems", Thomas May and Hermann Rohling, IEEE VTC, May 1998, pp. 2474-2478.
"Additiv Algorithm for Reduction of Crestfactor (AARC)", Nabil Hentati and Marc Schrader, 5th International OFDM Workshop 2000, Hamburg, 3 pgs.

(Continued)

*Primary Examiner*—Thanh Cong Le
(74) *Attorney, Agent, or Firm*—Eschweiler & Associates, LLC

(57) ABSTRACT

A device reduces the dynamic range of a signal at a first point along a signal processing direction in a transmitter of a communication system. The device includes an input to which an input signal is applied, a correction prediction device, a delay device, an addition device, and an output. The correction prediction device generates a predictive signal based on the input signal which represents the prediction of the signal at the first point, and generates a correction signal from the predictive signal. The delay device generates an input signal delayed by a delay from the input signal, the delay taking into consideration the processing time in the correction prediction device. The addition device subtracts the correction signal from the delayed input signal in order to generate a corrected signal. The output provides the corrected signal at a second point in front of the first point.

29 Claims, 17 Drawing Sheets

OTHER PUBLICATIONS

3GPP TS 25.213 V5.3.0 (Mar. 2003), 3rd Generation Partnership Project; Technical Specification Group Radio Access Network; Spreading and modulation (FDD) (Release 5), 2003, 3GPP Organizational Partners, 28 pgs.

3GPP TS 25.104 V6.2.0 (Jun. 2003), 3rd Generation Partnership Project; Technical Specification Group Radio Access Network; Base Station (BS) radio transmission and reception (FDD) (Release 6), 2003, 3GPP Organizational Partners, 59 pgs.

3GPP TS 25.141 V6.2.0 (Jun. 2003), 3rd Generation Partnership Project; Technical Specification Group Radio Access Network; Base Station (BS) conformance testing (FDD) (Release 6), 2003, 3GPP Organizational Partners, 159 pgs.

* cited by examiner

FIG 11
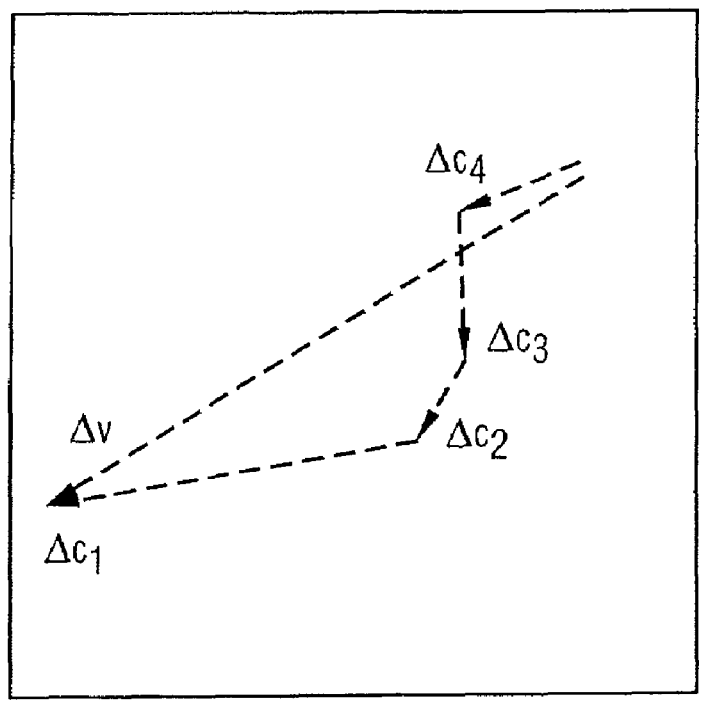
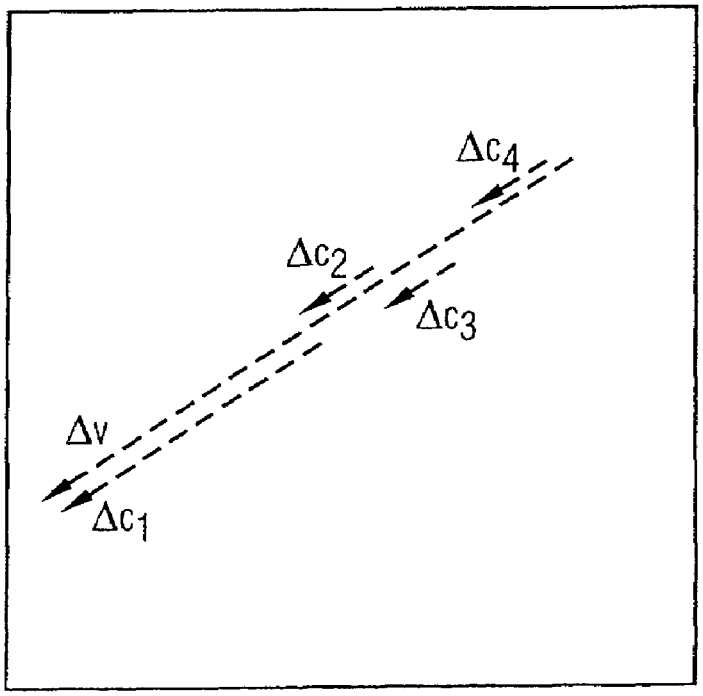

DEVICES FOR REDUCING THE DYNAMIC RANGE OF SIGNALS IN TRANSMITTERS OF COMMUNICATION SYSTEMS

REFERENCE TO RELATED APPLICATIONS

This application claims the benefit of the priority date of German application DE 10 2004 032 667.3, filed on Jul. 6, 2004, the contents of which are herein incorporated by reference in their entirety.

FIELD OF THE INVENTION

The present invention generally relates to transmitters in communication systems and particularly to devices for reducing the dynamic range of signals in transmitters of communication systems.

BACKGROUND OF THE INVENTION

Communication systems are frequently divided into wireless communication systems such as, e.g., mobile radio systems and wireless networks, and wire-connected communication systems. The Universal Mobile Telecommunications System (UMTS) is a current example of a mobile radio system. The basic architecture of a UMTS mobile radio system exhibits, among other things, mobile stations (User Equipment (UE)) and a radio access network (UMTS Terrestrial Radio Access Network (UTRAN)). The radio access network contains facilities for transmitting data via radio, such as, e.g., base stations which are called Node B in UMTS mobile radio systems. The base stations in each case supply a particular area and a cell, respectively, in which mobile stations can be located. The interface between a mobile station and a base station which communicate wirelessly by radio is called a radio interface (Uu Interface).

In the description following, reference is made to specifications 3GPP TS 25.213, V5.3.0 (2003-03), Spreading and modulation (FDD), 3GPP TS 25.104, V6.2.0 (2003-06), Base Station (BS) radio transmission and reception (FDD) and 3GPP TS 25.141, V6.2.0 (2003-06), Base Station (BS) conformance testing (FDD) of the 3rd Generation Partnership Project (3GPP), Technical Specification Group Radio Access Network.

In a UMTS mobile radio system, digital data to be transmitted on the route from a base station to a mobile station are initially subjected to channel coding. This provides the digital data with redundancy and protects them against faulty transmission via a disturbed mobile radio channel or, respectively, enables an error correction to be performed at the respective receiver of the data. The digital data are then divided into two data bit streams by a serial/parallel conversion and mapped onto symbols in a complex plane by means of a digital modulation method. The digital data are then distributed to physical channels within the capacity of the available transmission bandwidth by means of a multiple access method. The physical channels are combined with one another and then scrambled, for example station-specifically, by means of a scrambling code. To transmit the digital data via a mobile radio channel, orthogonal carrier signals are used. The mobile radio channel is divided for transmitting operation and receiving operation by means of a duplex method.

The digital modulation method used in the UMTS mobile radio system is quaternary phase shift keying (QPSK) or 16-quadrature amplitude modulation (16QAM), in which in each case two (QPSK) or four (16QAM) successive bits of a bit sequence to be transmitted are combined and are in each case mapped to a symbol of a symbol space spanned by a real in-phase branch (I) and an imaginary quadrature branch (Q) in the complex plane, which has four (QPSK) or 16 (16QAM) elements.

In the UMTS standard or in the 3GPP standard, respectively, the code division multiple access method (CDMA) is used as multiple access method in which a bipolar data bit stream to be transmitted is multiplied by a subscriber-specific bipolar code sequence or a spreading code and is spread. The elements of the spreading code are called chips in order to be able to semantically distinguish them from the bits of the data bit stream. In principle, chips are nothing other than bits. The multiplication of the data bit stream by the chip stream results again in a bipolar data stream. In general, the rate of the chip stream is a multiple of the rate of the data bit stream and this is determined by the length of the spreading code which is specified by a spreading factor (SF). The spreading factor corresponds to the number of chips per bit. With a constant chip rate on the radio transmission link between transmitters and receivers, the data bit rate represented in the chip stream is only dependent on the spreading factor of the respective subscriber-specific spreading code. In the UMTS mobile radio system, orthogonal spreading codes with variable spreading factor (OVSF=Orthogonal Variable Spreading Factor) are used in order to be able to implement variable data rates. The OVSF spreading codes are defined in specification 3GPP TS 25.213. In this arrangement, the data rate can fluctuate within a range from 32 kbit/s to 2 Mbit/s.

The wideband code division multiple access method (WCDMA) has been chosen by the ETSI (European Telecommunications Standard Institute) as the basis for the FDD UMTS radio interface (Uu Interface) in which an operation at the same data rate in both directions of transmission or, respectively, symmetric uplink/downlink operation is possible. According to the UMTS standard, data are transmitted between the base stations and the mobile stations in frames. Each frame has in each case 15 slots which in each case contain 2560 chips. One frame has a duration of 10 ms and a slot thus has a duration of 666 µs and a chip has a duration Tc of about 0.2604 µs. The chip rate $F_{chip}$ is 38 400 chips per frame or, respectively, 3.84 Mchips/s.

To separate transmit signals from receive signals of a base station or a mobile station or, respectively, separate the uplink from the mobile station to the base station from the downlink from the base station to the mobile station, the time division duplex method (TDD) or the frequency division duplex method (FDD) can be used in UMTS mobile radio systems. In the FDD method, the stations transmit and receive in each case separate frequency bands. In this arrangement, the transmit band of one station is the receive band of the other station and vice versa.

All subscribers use the multiple access method for impressing a fingerprint on their useful data by means of a subscriber-specific spreading code which allows the transmitted signal to be restored from the sum of the received signals. Various data bit streams which are to be transmitted in parallel from a transmitter are multiplied by orthogonal spreading codes in the real in-phase branch and the imaginary quadrature branch of the modulation method and are then added. The complex sum signal is then also scrambled with a specific complex scrambling code by means of a chip-wise and frame-aligned complex multiplication of the sum signal. In the FDD mode of the UMTS mobile radio system, the scrambling code is station-specific, i.e. each base station and each mobile station can use a different scrambling code. From the received chip sequence, the bits of the data bit stream can be recovered in a receiver by repeating the process of multiplication. For this purpose, the chip stream is again multiplied or correlated in the correct phase with the same spreading code which was already used in the transmitter which again results in the transmitted data bit stream.

On the uplink, for example, information is transmitted from the mobile stations via a radio link to the base stations. The information of various mobile stations is coded in accordance with the CDMA multiple access method and transmitted in physical channels which are combined to form one radio signal via a common frequency channel or radio channel to the base stations with which the mobile stations are in radio contact. In the FDD mode, a physical channel is defined by the spreading code, which is also called a channelization code, and by the frequency channel.

Generally, a distinction is made between so-called dedicated physical channels and common physical channels. A dedicated physical channel is exclusively used by one connection and is reallocated during the call set-up and possibly during the call. Common physical channels are simultaneously or alternately utilized by a number of calls.

In the FDD mode, physical channels are, for example, the dedicated physical channel (DPCH), the common control physical channel (CCPCH), the common pilot channel (CPICH) and the synchronization channel (SCH). The SCH is a channel of the downlink and is used for cell search and synchronization of the mobile stations. It is subdivided into two subchannels, the primary synchronization channel (P-SCH) and the secondary synchronization channel (S-SCH). The P-SCH is identical for all cells and is, therefore, sent out without scrambling.

FIG. 12 shows the arrangement of a transmitter or, respectively, a modulation arrangement which is defined in specification 3GPP TS 25.213 for the downlink, i.e. from a base station to a mobile station. In this case, the transmitter uses a particular carrier frequency of $\omega/2\pi$. A bit stream of a plurality of bit streams with different bit rates is in each case converted by a serial-parallel converter (S->P) into in each case two parallel bit streams. The two bit streams are mapped onto symbols in the complex plane by a mapping device according to a digital modulation method such as, e.g., QPSK or 16QAM (Quadrature Amplitude Modulation). The symbol streams allocated to the in-phase branch (I) and to the quadrature branch (Q) are spread with a respective spreading code $C_{ch,SF,m}$ in multiplication devices. In this arrangement, a different spreading code is allocated to each physical channel. The resultant real chip streams of the quadrature branch (Q) and of the in-phase branch (I) are converted by addition into a single complex chip stream and this chip stream is then scrambled or encoded by means of a complex scrambling code $S_{dl,n}$. After the scrambling, each physical channel is weighted (point S) by means of a weighting factor Gi in accordance with its power level. The resultant chip streams are combined in an addition device and in a further addition device, the synchronization channels P-SCH and S-SCH weighted with the weighting factors $G_P$ and $G_S$ are added to the complex chip stream. The resultant chip stream is divided into a real component and an imaginary component in a device (point T). The spectra of the real component and of the imaginary component are shaped in two shape filters such as, e.g., RRC (square Root Raised Cosine) filters, which exhibit a roll-off of 20%. The filtered chip stream or, respectively, the signal representing it is finally up-converted by mixers to the particular carrier frequency using orthogonal carrier signals, and conducted to a power amplifier (not shown) and to a transmitting antenna (not shown).

The signal which is theoretically obtained at the transmitting antenna is a reference signal. The definition of the WCDMA downlink signal is specified in specification 3GPP TS 25.213. To facilitate the implementation of a transmitter, the UMTS standard according to specifications 3GPP TS 25.104 and 3GPP TS 25.141 allows an actual signal to differ slightly from the reference signal and defines quality requirements which must be met. The quality requirements are defined by reference signals which must be used during tests (test modes 1 to 5) and quality factors which must be measured during tests. These are the error vector magnitude (EVM), the peak code domain error (PCDE) and the adjacent channel leakage power ratio (ACLR).

The chip stream or, respectively, the signal at point T is a sum of many complex random signals of various physical channels. The result of this sum is a Gaussian signal which disadvantageously has a wide dynamic range. The filtering operations following point T can further increase the dynamic range of the signal if the spreading codes have not been suitably selected.

FIG. 13 shows the complementary cumulative distribution function (CCDF) of a WCDMA signal, both at point T and at the output of the transmitter of FIG. 12. The vertical axis represents the probability of the instantaneous power of a signal being greater than the value along the horizontal axis. The probability value used for defining the dynamic range of the signal is $10^{-4}$. FIG. 13 shows that the power of the WCDMA signal at point T exhibits a dynamic range of 10 dB with respect to the root mean square (RMS) of the power. Furthermore, it can be seen from the complementary cumulative distribution function for the output of the transmitter that the dynamic range becomes greater if the processing following point T in the transmitter is taken into consideration.

The device in the transmitter influenced most by a wide dynamic range of the generated signal is the power amplifier which, among other things, is the most complex and expensive item. The power amplifier must have a linear characteristic over the entire input range. With a WCDMA signal, the operating point of the power amplifier must be far away (10 dB or more) from its saturation point in order to avoid nonlinear effects and signal leakage into adjacent channels. The result of this is that the power amplifier must be selected to be oversized with respect to the desired rms power; that a larger cooling system is required for the larger power amplifier since the efficiency of a power amplifier is very low; that the requirements for setting the operating point of the power amplifier are higher; and that the power consumption of the power amplifier is greater. In summary, this is associated with greater expenditure and with higher costs for the operator of a mobile radio system.

WO 99/53625 A1 describes an implementation of an amplitude limiting system in a CDMA system which is described in the text which follows.

FIG. 14A firstly shows an implementation of a conventional transmitter. As in FIG. 12, a symbol source generates complex symbols with a symbol rate of 1/T. When the symbol source generates a WCDMA signal, its symbol rate or chip rate is 3.84 MHz. The complex symbols are fed into a shape filter which generates at an output of said filter an interpolated version of the symbol sequence with a symbol rate increased by K and a desired spectrum. The symbol sequence is then mixed to an intermediate frequency in a mixer and converted into a continuous analogue time domain signal using a digital/analogue converter (DAC). After further analogue processing in a processing device which exhibits several stages of band-pass filtering and mixing to the suitable carrier frequency, the signal is conducted to a power amplifier and finally to a transmitting antenna.

FIG. 14B shows the transmitter of FIG. 14A with a precompensation device between the symbol source and the shape filter as described in WO 99/53625 A1. The precompensation device is used for reducing the dynamic range of a signal to be transmitted. FIG. 15 also shows a diagrammatic representation of the precompensation device. The amplitude of the symbols of a sequence x(nT) of an input signal is compared with a threshold value in the precompensation device. When this threshold value is exceeded, a damping factor a(nT) is calculated. From the multiplication of the symbols with the damping factor x(nT)*a(nT) in a multiplication device, a sequence $x_c$(nT) of a corrected signal or, respectively, of an output signal of the precompensation device is obtained. The damping factor a(nT) is determined as follows:

if |x(nT)|>threshold value a(nT)=1−(1−threshold value/|x(n)|)

else a(nT)=1 (1)

A significant advantage of the transmitter in FIG. 14B consists in that due to the fact that the correction is carried out before the shape filter, no leakage from the desired signal band can be expected. However, the transmitter has a significant disadvantage which will be illustrated by means of an example. Let it be assumed that the symbol source generates one of the following three sequences of symbols:

1) +1 0 0 0 +1 0 0 0 +1 0 0 0 +1 0

2) +1 +1 +1 +1 0 0 0 0 0 0 0 0 0 0

3) −1 +1 +1 −1 0 0 0 0 0 0 0 0 0 0 (2)

These three sequences have the same energy and the same dynamic range. The sequences are then sent to the shape filter which is, e.g., an RRC filter. At the output of the shape filter, the three sequences generate signals with very different dynamic ranges. The third sequence, in particular, generates, at the output of the shape filter, a sequence with a peak which is greater than a peak in a sequence which is generated at the output of the shape filter by the first sequence. Since the shape of the signal, after passing through a number of interpolation stages in the transmitter, is unknown for the precompensation device of FIG. 15, the threshold value must be set to a very low value in the precompensation device in order to achieve the desired dynamic range in the power amplifier. This influences all sequences in the same manner and the system does not distinguish between sequences in which no correction is required and sequences in which a correction is required. The result of this is that unnecessary disturbances or distortions are introduced into a signal or a sequence.

Therefore, a significant disadvantage of the transmitter of FIG. 14B and of the precompensation device of FIG. 15, respectively, consists in that the precompensation device cannot distinguish when a correction of a sequence of a signal is required and when not, and, therefore, cannot effect an efficient reduction of the dynamic range of a signal in a transmitter without unnecessarily distorting the signal.

A further known possibility for reducing the dynamic range of a signal consists in using FIR filters for generating a correction signal from a sequence of an amplitude correction signal, the correction signal being added to the signal.

In T. May, H. Rohling, "Reducing the Peak-to-Average Power Ratio in OFDM Radio Transmission Systems", Proc. IEEE VTC '98, Phoenix, May 1998, pp. 2472-2478 and N. Hentati, M. Schrader, "Additive Algorithm for Reduction of Crest Factor", 5th International OFDM Workshop 2000, Hamburg, pp. 27-1-27-5, devices and methods for reducing the dynamic range of orthogonal frequency division multiplex (OFDM) signals are described.

Both T. May et al. and N. Hentati et al. achieve the reduction of a crest factor of a signal by adding a correction signal to the signal.

$$x_c(n)=x(n)+c(n) \quad (3)$$

x(n) is a sampling sequence or sequence of a signal to be corrected, c(n) is a sequence of a correction signal and $x_c$(n) is a sequence of a corrected signal. The sequence of the correction signal is obtained as follows:

$$c(n) = \sum_{k=-\infty}^{\infty} h_{n-k} \cdot \Delta c(k) \quad (4)$$

h(.) is a pulse which is used for the correction, and Δc(k) is a sequence Δc(k) of an amplitude correction signal which is used for reducing the crest factor to a target value. In T. May et al. and N. Hentati et al., the sequence Δc(k) of the amplitude correction signal is obtained by using the following expression:

Δc(k)=x(k)−x(k)/|x(k)|·threshold value (5)

The pulse h(.) is either a Gaussian or an si-function-like (si=sinx/x) pulse. An impulse response of a complex band-pass filter can be used for signals which are allocated to frequencies not equal to zero. One possibility for generating the pulses h(.) is using a filter with a finite impulse response (FIR). In the case where the pulse or, in this case, the impulse response of the FIR filter has a length of 2N+1 coefficients, equation 4 receives the form $$c(n) = \sum_{k=-N}^{N} h_{n-k} \cdot \Delta c(k) \quad (6)$$

FIG. 16 shows a device for reducing the dynamic range of an OFDM signal. The device exhibits an amplitude correction signal generating device, an FIR filter with delay elements ($z^{-1}$) and coefficients $h_i$, a delay device and an addition device. The coefficients $h_i$ of the FIR filter are 2N+1 samples of a pulse h(n). In T. May et al., it is assumed that the main coefficient $h_0$ is equal to 1. The amplitude correction signal generating device then generates a sequence Δc(k) of an amplitude correction signal according to equation 5. If the sequence Δc(k) of the amplitude correction signal differs from zero, the output signal of the FIR filter is equal to the sequence c(n) of the desired correction signal after N+1 steps. If the delay of the delay device for the sequence x(k) of the signal to be corrected is equal to N+1, the sequence c(n) of the correction signal of the FIR filter is aligned with the sequence x(n) of the delayed signal to be corrected. If the sequence c(n) of the correction signal is subtracted from the sequence x(n) of the delayed signal in the addition device, a sequence $x_c(n)$ of the corrected signal having a desired dynamic range is generated.

FIG. 17 shows the sequence c(n) of the correction signal which is generated by the FIR filter, and a sequence Δc(k) of the associated amplitude correction signal which is shown as a narrower curve with points for a case in which the target dynamic range or, respectively, the threshold value is large. The filtered sequence of the amplitude correction signal or, respectively, the sequence c(n) of the correction signal exactly matches the sequence Δc(k) of the amplitude correction signal fed into the FIR filter at the correction times. The sequence x(n) of the signal to be corrected exceeds the desired threshold value with a very low probability and corrections are only necessary occasionally.

FIG. 18 shows the sequence c(n) of the correction signal for a case in which the target dynamic range or, respectively, the threshold value is of medium magnitude. The corrections already occur with such frequency that the pulses of the sequence c(n) of the correction signal overlap. Nevertheless, the correspondence between the sequence c(n) of the correction signal and the sequence Δc(k) of the amplitude correction signal at the input of the FIR filter is good at the correction times. The correction signal of the FIR filter is slightly too large for the middle correction value.

FIG. 19 shows the sequence c(n) of the correction signal which is generated by the FIR filter for the case in which the threshold value of the dynamic range is set to a very low value and, therefore, the pulses of the sequence of the correction signal overlap much more. The correspondence between the sequence c(n) of the correction signal and the values of the sequence Δc(k) of the amplitude correction signal at the input of the FIR filter is poor at the correction times.

A disadvantage of the device for reducing the dynamic range of an OFDM signal in FIG. 16, therefore, consists in that with a very low threshold value of the dynamic range, overcorrection of the signal to be corrected occurs and the overcorrection introduces unnecessary noise into the signal to be corrected. The problem of overcorrection is based on the fact that the tails of old pulses of the correction signal overlap new pulses.

A further disadvantage of the device consists in that possibly unwanted larger peaks are generated outside the correction times.

In some countries, the operators of a mobile radio system can use more than one carrier frequency in a cell of a mobile radio system. These carrier frequencies are located in adjacent frequency channels with a spacing of, for example, about 5 MHz. In such mobile radio systems, therefore, it is necessary to reduce the dynamic range of signals to be transmitted for all carrier frequencies.

FIG. 20 shows a conventional transmitter for generating a number of carrier signals (N) having different carrier frequencies. To implement such a transmitter, a basic transmitter structure is repeated for the N carriers. The basic transmitter structures in each case exhibit mapping devices for digital modulation such as, e.g., QAM modulation, of bit streams $b_i$, weighting devices for weighting the bit streams with weighting factors $G_i$, a spreading code generator for spreading the weighted bit streams with spreading codes $C_{CH,SF,n}$ and for generating chip streams (physical channels) with a chip rate $F_{chip}$, a first addition device for combining the physical channels to form one signal, a scrambling code generator for scrambling the signal (point S), a second addition device for adding synchronization channels to the signal (point T), a shape filter, a processing device and a power amplifier, for various physical channels. The N carrier signals of the N basic transmitter structures are added in a third addition device and the resultant multi-carrier signal is conducted to an antenna.

FIG. 21 shows a further conventional transmitter for generating a number of carrier signals having different carrier frequencies. This transmitter is similar to the transmitter of FIG. 20 but can be implemented with much lower expenditure. In the transmitter of FIG. 21, each carrier signal of a basic transmitter structure is mixed to an intermediate frequency f by means of a mixer following the shape filter. The frequency spacing between the carrier signals already corresponds to the required frequency spacing. The carrier signals of the individual basic transmitter structures are then added outside these by means of the third addition device in order to generate a multi-carrier signal. The multi-carrier signal is then finally up-converted to a centre radio frequency in a processing device and sent to a single multi-carrier power amplifier and to an antenna. Since the power amplifiers are the most elaborate components in the transmitters, the reduction in complexity of the transmitter of FIG. 21 in comparison with the transmitter of FIG. 20 becomes clear immediately. In the transmitter of FIG. 20, a power amplifier is provided in each basic transmitter structure whereas only one multi-carrier power amplifier is needed in the transmitter of FIG. 21.

However, a disadvantage of the transmitter in FIG. 21 consists in that the multi-carrier signal has a dynamic range which is greater than the dynamic range of the individual carrier signals as is also shown in FIG. 13. This makes it more difficult to meet the requirements for the multi-carrier power amplifier and it is necessary to reduce the wide dynamic range.

In multi-carrier WCDMA Basestation Design Considerations —Amplifier Linearization and Crest Factor Control— Technology White Paper—PMC Sierra Inc.—Issue 1: Aug. 1, 2002, Andrew Right and Oliver Nesper describe devices for reducing the dynamic range of a multi-carrier signal.

FIG. 22 shows such a device for reducing the dynamic range of a multi-carrier signal which can be used for a transmitter in FIG. 21 from point T onward. N signals which in each case have a chip rate $F_{chip}$ are firstly interpolated to a higher rate by means of a shape filter such as, e.g., an RRC filter or an equivalent device. At this rate, it is possible to mix the respective signal to an intermediate frequency $f_1$, $f_2, \ldots, f_N$ by means of an associated mixer. The N generated carrier signals $x_1, x_2, \ldots x_N$ at outputs of the mixers have the desired spacing between the carrier frequencies. At this point, the carrier signals are added by means of a first addition device in order to generate a reference multi-carrier signal v. If the amplitude/power of the reference multi-carrier signal v exceeds a threshold value which is fixed or variable, a multi-carrier amplitude correction signal Δv is calculated by means of a multi-carrier amplitude correction signal generating device in order to push the reference multi-carrier signal v below the threshold value. The reference multi-carrier signal v, the multi-carrier amplitude correction signal Δv and the carrier signals $x_1, x_2, \ldots x_N$ are then fed into a correction pulse generator which generates from these N complex single-carrier correction signals $c_1$, $c_2, \ldots c_N$. The single-carrier correction signals $c_1, c_2, \ldots c_N$ are in each case pulses $h_1(.), h_2(.), \ldots, h_N(.)$ modulated with single-carrier amplitude correction signals $\Delta c_1, \Delta c_2, \ldots \Delta c_N$. Each single-carrier correction signal $c_1, c_2, \ldots c_N$ is in each case allocated to a carrier signal $x_1, x_2, \ldots x_N$. The single-carrier correction signals $c_1, c_2, \ldots c_N$ are finally added to a delayed version of each carrier signal $x_1$, $x_2, \ldots x_N$ in second addition devices in order to generate corrected carrier signals. The delayed carrier signals are generated by delay devices and the respective delay equalizes the processing time of the first addition device, the multi-carrier amplitude correction signal generating device and the correction pulse generator and the group delay of the pulses. The N corrected carrier signals are then added together in a third addition device to form a multi-carrier signal and are sent to further up-conversion stages and, finally, to the multi-carrier power amplifier as shown in FIG. 21. The pulses $h_i(.)$ have the function of reducing the spectral power density of an error within the carrier band in such a manner that the requirements for the adjacent-channel leakage ratio (ACLR) are met. The N pulses $h_i$, which are modulated with the single-carrier amplitude correction signals $\Delta c_1, \Delta c_2, \ldots \Delta c_N$, when added together, form a multi-carrier correction signal. If the multi-carrier correction signal is added to a properly delayed multi-carrier signal, its amplitude at the sampling position $t_0$ at which originally a peak was detected is reduced. These pulses can be low-pass pulses which are then up-converted to the relative carrier frequency, or complex band-pass pulses which are designed for the carrier band.

FIG. 23 shows a diagram which represents the effect of the device of FIG. 22, considering N=4 carrier signals. The four carrier signals are represented by the vectors $x_1$, $x_2$, $x_3$ and $x_4$ in the complex plane. When the carrier signals are added, they generate the reference multi-carrier signal v or, respectively, the vector of the reference multi-carrier signal v. The vector of the reference multi-carrier signal v is outside a target region which is defined by the threshold value. The target region is represented by complex points within a circle. The device of FIG. 22 generates a multi-carrier amplitude correction signal $\Delta v$ which reduces the amplitude (power) of the reference multi-carrier signal v in the target region.

The multi-carrier amplitude correction signal is obtained from $\Delta v = -\alpha \cdot v$ and is distributed over the four carrier signals $x_i$. FIG. 23 shows in this regard the choice of the N single-carrier amplitude correction signals known from Andrew Right et al.:

$$\Delta c_1 = -\alpha \cdot x_1, \Delta c_2 = -\alpha \cdot x_2, \ldots, \Delta c_N = -\alpha \cdot x_N \quad (7)$$

FIG. 23 shows that the vectorial addition of the four single-carrier amplitude correction signals $\Delta c_i$ corresponds to the multi-carrier amplitude correction signal $\Delta v$. At time $(t_0)$, at which the amplitude reduction is necessary, the single-carrier amplitude correction signals $\Delta c_i$ reduce the amplitude in the target region. For different times, the multi-carrier amplitude correction signal $\Delta v$ is the sum of the pulses $$(\Delta c_1 \cdot h_1(t-t_0), \Delta c_2 \cdot h_2(t-t_0), \ldots \Delta c_N \cdot h_N(t-t_0)) \quad (8)$$

$t_0$ is the time at which the amplitude correction is necessary.

A disadvantage of selecting the single-carrier amplitude correction signals according to equation 7 consists in that they cause too great a distortion of the multi-carrier signal. The power of this distortion is proportional to the energy of the pulses used and to the amplitude of the single-carrier amplitude correction signals used. The pulses possibly have the same energy.

FIG. 24 shows a diagram which represents the effect of the device of FIG. 22 for the case in which a vector, in this case the vector of the carrier signal $x_3$, is not the cause of the large amplitude of the reference multi-carrier signal v. In the calculation of the single-carrier amplitude correction signals according to equation 7, the single-carrier amplitude correction signal $\Delta c_3 = -\alpha \cdot x_3$ actually represents too much correction, which introduces unnecessary noise into the carrier signal $x_3$.

In the cases described above, signals are considered which themselves are a sum of a number of signals. Each of these signals has different frequency bands and can be generated by different modulation methods. These can be individual carrier signals or a number of carrier signals which are modulated with different modulation methods such as, e.g., the quaternary amplitude modulation (QAM) or the quaternary phase shift keying (QPSK) and are coded with multiple access methods (CDMA, WCDMA etc.) or coded multi-carrier techniques (OFDM=Orthogonal Frequency Division Multiplex). These signals have a dynamic range which fluctuates greatly and is in some cases wide and which leads to great complexity in the circuits, and particularly amplifiers, used in a transmitter.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

The present invention includes a device which provides for efficient reduction in the dynamic range of a signal without unnecessarily distorting the signal.

The present invention discloses a device for reducing the dynamic range of a signal at a first point along a signal processing direction in a transmitter of a communication system. The device includes an input to which an input signal is applied, a correction prediction device, a delay device, an addition device, and an output. The correction prediction device generates a predictive signal based on the input signal which represents the prediction of the signal at the first point, and generates a correction signal from the predictive signal. The delay device generates an input signal delayed by a delay from the input signal, the delay taking into consideration the processing time in the correction prediction device. The addition device subtracts the correction signal from the delayed input signal in order to generate a corrected signal. The output provides the corrected signal at a second point in front of the first point.

According to another aspect, signals in the transmitter exhibit or comprise sequences of symbols and the correction prediction device exhibits a number of prediction devices, each prediction device being allocated to a particular phase in each symbol of the signal at the first point and in each case generating a predicted signal for the respective phase.

According to a further aspect, the correction prediction device also exhibits correction signal generating devices which in each case compare values of a respective predicted signal with a respective threshold value and in each case generate in dependence on the result of the comparison single-phase correction signals by means of which a signal which is below the respective threshold value can be generated from the respective predicted signal.

According to a further aspect, the correction prediction device also exhibits a correction combining device which combines the single-phase correction signals in order to generate the correction signal.

According to a further aspect, the prediction devices are finite impulse response filters.

According to another aspect, the phases in which the prediction devices are allocated in each case are equally spaced apart from one another.

According to another aspect, the correction prediction device exhibits an interpolation filter which generates the predictive signal.

According to a another aspect, the correction prediction device also exhibits a correction signal generating device which in each case compares values of the predictive signal with a threshold value and generates a polyphase correction signal in dependence on the result of the comparison.

The invention also discloses a device for reducing the dynamic range of a signal at a particular point along a signal processing direction in a transmitter of a mobile radio system, comprising an input to which an input signal is applied, an amplitude correction signal generating device which generates an amplitude correction signal from the input signal, a forward filter which generates a correction signal from a modified amplitude correction signal, a feedback filter which generates from the modified amplitude correction signal an output signal of the latter which represents the value of a preceding pulse of the correction signal, a processing device which generates the modified amplitude correction signal from the amplitude correction signal and the output signal of the feedback filter, in such a manner that there is no overlap between pulses of the correction signal, a delay device which generates an input signal delayed by a delay from the input signal, the delay taking into consideration the processing time in the amplitude correction signal generating device, the processing device and the forward filter, an addition device in which the correction signal is subtracted from the delayed input signal in order to generate a corrected signal which exhibits a reduced dynamic range, and an output at which the corrected signal is output.

According to another aspect, the processing device sets a value of the modified amplitude correction signal to zero if the value of a preceding pulse of the correction signal, which is represented by the output signal of the feedback filter, is greater than the value of the amplitude correction signal and otherwise sets the value of the modified amplitude correction signal to the difference between the value of the amplitude correction signal and the value of a preceding pulse of the correction signal.

According to another aspect, the amplitude correction signal generating device compares the values of the input signal with a threshold value and generates in dependence on the result of the comparison the amplitude correction signal by means of which a signal which is below the threshold value can be generated from the input signal.

According to another aspect, the forward filter and the feedback filter are a finite impulse response filter or an infinite impulse response filter.

The invention also provides a device for reducing the dynamic range of a number of carrier signals which have different carrier frequencies at a particular point along a signal processing direction in a transmitter of a mobile radio system, comprising inputs to which the carrier signals are applied, an addition device in which the carrier signals are added in order to generate a reference multi-carrier signal, a multi-carrier amplitude correction signal generating device which compares the reference multi-carrier signal with a threshold value and generates in dependence on the result of the comparison a multi-carrier amplitude correction signal by means of which a signal which is below the threshold value can be generated from the reference multi-carrier signal, a correction pulse generator which generates in dependence on the multi-carrier amplitude correction signal respective single-carrier amplitude correction signals from the multiplication of the multi-carrier amplitude correction signal by an associated coefficient and single-carrier correction signals for correcting the carrier signals from the multiplication of the single-carrier amplitude correction signals by associated pulses, delay devices which generate carrier signals delayed by an associated delay from the carrier signals, the respective delay taking into consideration the processing time in the addition device, the multi-carrier amplitude correction signal generating device and the correction pulse generator, addition devices which add the single-carrier correction signals to the associated delayed carrier signals in order to generate in each case corrected carrier signals which exhibit a reduced dynamic range, and outputs at which the corrected carrier signals are output.

According to another aspect, the coefficients are $\alpha_i=1/N$, N being the number of carrier signals.

According to another aspect, the correction pulse generator also generates the single-carrier correction signals in dependence on the carrier signals and the coefficients are $\alpha_i=P_i/(P_1+P_2+\ldots+P_N)$, where i=1 ... N, N is the number of carrier signals and $P_i$ is the power associated with the carrier signal i.

According to another aspect, the correction pulse generator also generates the single-carrier correction signals in dependence on the carrier signals and the coefficients are $\alpha_i=\sqrt{P_i}/(\sqrt{P_1}+\sqrt{P_2}+\ldots+\sqrt{P_N})$, where i=1 ... N, N is the number of carrier signals and $P_i$ is the power associated with the carrier signal i.

According to another aspect, the correction pulse generator also generates the single-carrier correction signals in dependence on the carrier signals and the coefficients are $\alpha_i=|x_i|/(|x_1|+|x_2|+\ldots+|x_N|)$, where i=1 ... N, N is the number of carrier signals and $x_i$ is the amplitude of a carrier signal i.

According to another aspect, the correction pulse generator also generates the single-carrier correction signals in dependence on the carrier signals and the reference multi-carrier signal, and the correction pulse generator in each case calculates the projection onto a vector of the reference multi-carrier signal for a vector of a respective carrier signal and does not correct the respective carrier signal when the projection exhibits a direction opposite to the vector of the reference multi-carrier signal and calculates the coefficient with $\alpha_i=n_i/(n_1+n_2+\ldots+n_N)$ when the projection exhibits the same direction as the vector of the multi-carrier signal (v), where i=1 ... N, N is the number of carrier signals and $n_i$ is the projection of a vector of a carrier signal $x_i$ onto the vector of the reference multi-carrier signal.

According to another aspect, the correction pulse generator takes into consideration a particular number of the most significant projections in calculating the coefficients.

According to another aspect, the correction pulse generator also exhibits a correction distribution device which calculates the coefficients and generates the single-carrier amplitude correction signals from the multiplication of the multi-carrier amplitude correction signal by the coefficients, and pulse generators, one pulse generator in each case being allocated to one carrier signal and generating a respective single-carrier correction signal from the multiplication of a respective single-carrier amplitude correction signal by an associated pulse.

According to another aspect, the correction pulse generator also exhibits first mixers which in each case down-convert an associated single-carrier amplitude correction signal into a baseband and forward it to a respective pulse generator, and second mixers which in each case up-convert an associated single-carrier correction signal to the respective carrier frequency.

According to another aspect, the pulses are complex band-pass pulses and exhibit spectral characteristics which are similar to the spectral characteristics of the associated carrier signals.

According to another aspect, the pulses are equal low-pass pulses and exhibit spectral characteristics which are similar to the spectral characteristics of the associated carrier signals.

According to another aspect, the first point or the particular point in the transmitter is an output of a shape filter, of a mixer, of a digital/analogue converter or of an amplifier.

According to another aspect, the communication system is a mobile radio system or a wireless local area network (WLAN).

According to another aspect, the mobile radio system is a UMTS mobile radio system.

The present invention permits employing an equivalent model that describes all stages of a transmitter for predicting a signal. As a result, the distortion of the signal can be reduced without reducing performance of the dynamic range. Overcorrection of the dynamic range can also be mitigated. Spectral characteristics of a correction signal are not modified since only the input signal of a forward filer is modified. Additionally, correspondence of correction values with a desired correction at correction times can be improved and distortion power can be reduced. Further, secondary peaks generated by a correction of an input signal can be reduced and, therefore a better reduction of the dynamic range can be obtained as compared with conventional devices. Individual carrier signals of a multi-carrier signal are also typically less distorted.

BRIEF DESCRIPTION OF THE DRAWINGS

In the text which follows, preferred illustrative embodiments of the present invention are explained in greater detail with reference to the attached drawings, in which:

FIG. 11 shows a diagram which represents the effect of the device of FIG. 9.

DETAILED DESCRIPTION OF THE INVENTION

Figure 1:
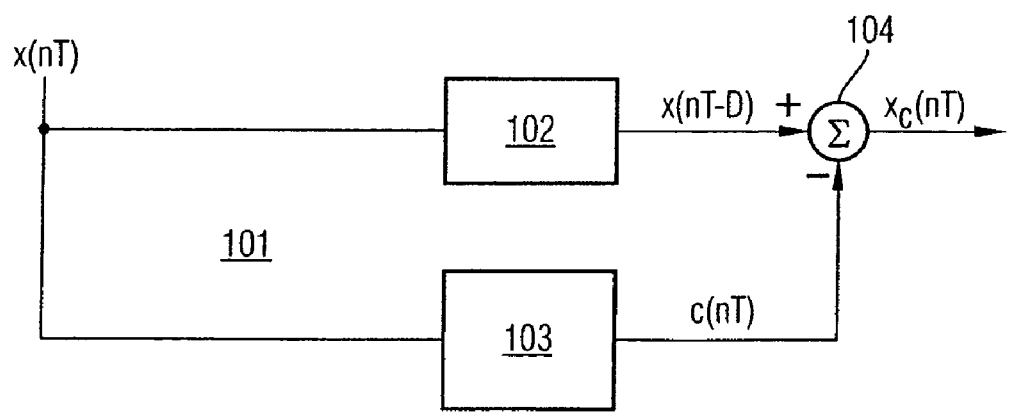
FIG. 1 shows an illustrative embodiment of a device according to the invention.

FIG. 1 shows an illustrative embodiment of a device for reducing the dynamic range of a signal according to the invention. The device is used for reducing the dynamic range of a signal at a first point in a signal processing direction in a transmitter of a communication system. The device is arranged at a second point along the signal processing direction within the transmitter which is located in front of the first point.

The communication system can be a mobile radio system and can be alternatively any wireless communication system such as, e.g., a wireless local area network (WLAN) or a wire-connected communication system. The transmitter is can be a transmitter of a base station of a UMTS mobile radio system. Signals in the transmitter are typically generated by a symbol source which maps bit streams to sequences of symbols, for example, by means of the QPSK modulation method and distributes these to physical channels by means of the WCDMA multiple access method. The device is can be used in a transmitter according to FIG. 14A. The first point is, e.g., the output of the shape filter, of the mixer, of the digital/analogue converter or of the power amplifier in FIG. 14A. The second point is, for example, the output of the symbol source in FIG. 14A.

The device 101 exhibits a delay device 102, a correction prediction device 103 and an addition device 104. To an input of the device 101, a sequence $x(nT)$ or, respectively, symbol sequence of an input signal is applied which is a signal at the second point in the transmitter at which the device 101 is arranged. In this arrangement, T is the symbol interval. In the delay device 102, a sequence $x(nT-D)$ of a delayed input signal is generated from the sequence $x(nT)$ of the input signal. The delay D takes into consideration the processing time of the correction prediction device 103. From the sequence $x(nT)$ of the input signal, a sequence $c(nT)$ of a correction signal is generated by the correction prediction device 103. The correction prediction device 103 predicts a sequence of a signal which is effected by the sequence $x(nT)$ of the input signal of the device 101, which is located at the second point within the transmitter, at the first point within the transmitter and calculates a sequence $c(nT)$ of a correction signal in such a manner that the signal at the first point exhibits the desired reduced dynamic range.

Figure 14A:
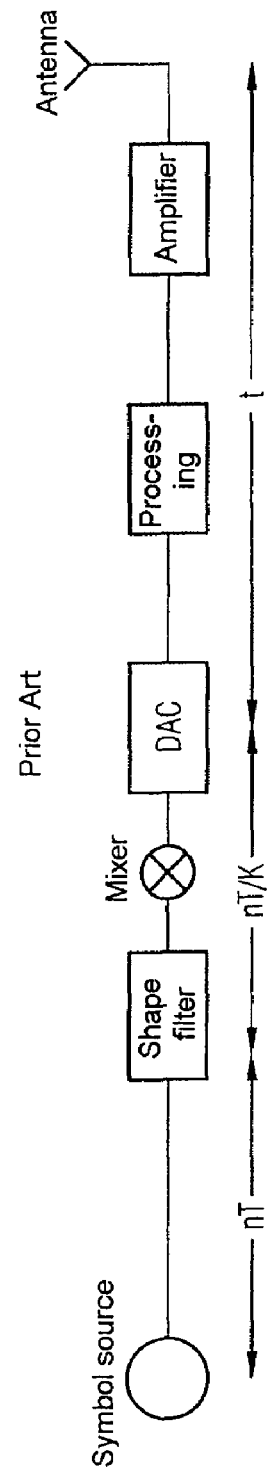
FIGS. 14A and 14B show further known transmitters.
Figure 14B:
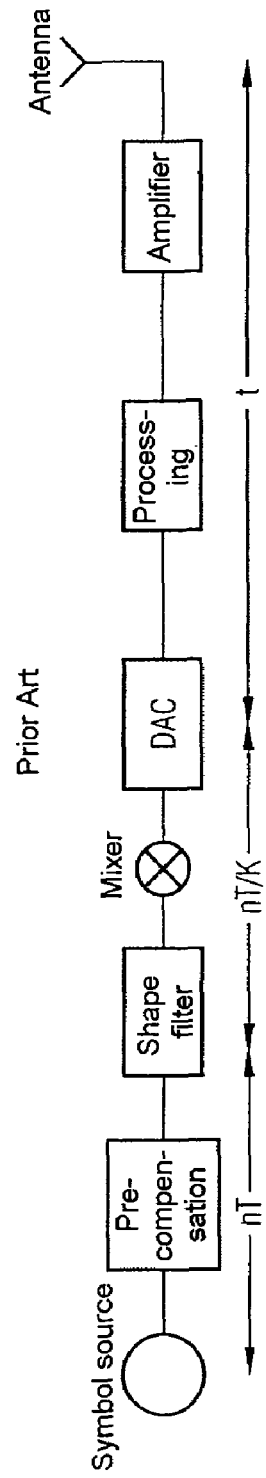

The prediction only performs corrections on the input signal which are actually necessary, and the signal at the first point is not unnecessarily distorted in comparison with the transmitter and the precompensation device of FIG. 14B. In the addition device 104, the sequence c(nT) of the correction signal is subtracted from the sequence x(nT−D) of the delayed input signal in order to generate the sequence $x_c$(nT) of a corrected signal as output signal of the device 101. This corrected signal produces a signal with a reduced dynamic range at the first point.

Figure 2:
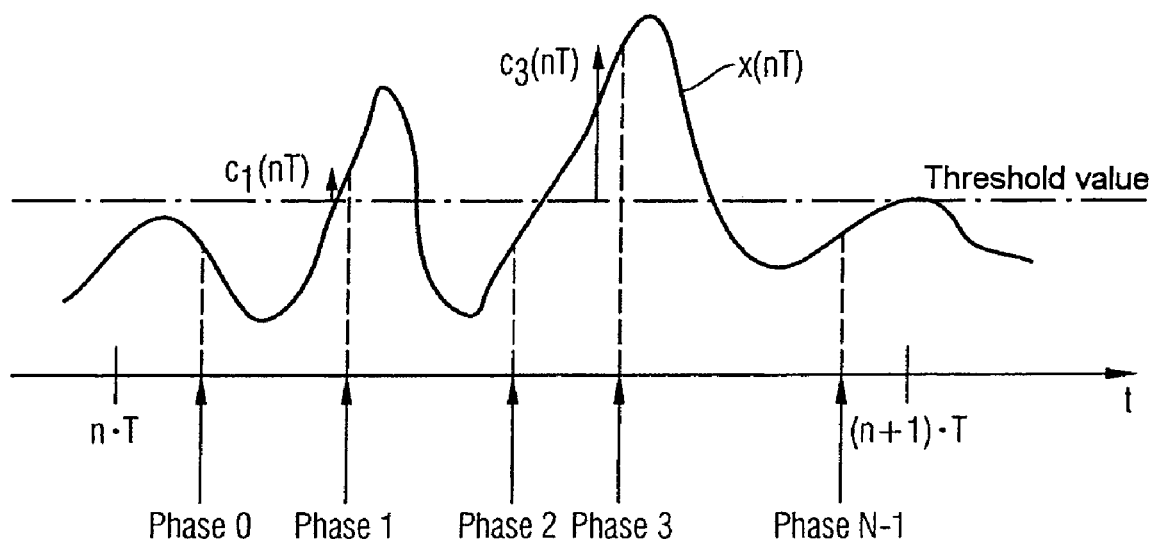
FIG. 2 shows an input signal of a device of FIG. 1.

FIG. 2 shows the sequence x(nT) of the input signal which is processed in the device of FIG. 1. The symbol interval T of the sequence x(nT) of the input signal is subdivided into N samples or points in time. Reference is made to these times as phase 0, phase 1, . . . , phase N−1. The N phases in the interval [nT, (n+1)T] are generally spaced apart equally but, as an alternative, can also be spaced apart unequally. In the correction prediction device 103 of FIG. 1, N prediction devices predict the values of the sequence of a signal at the N times (phases) within the symbol interval as will be explained in greater detail in the text which follows.

Figure 3:
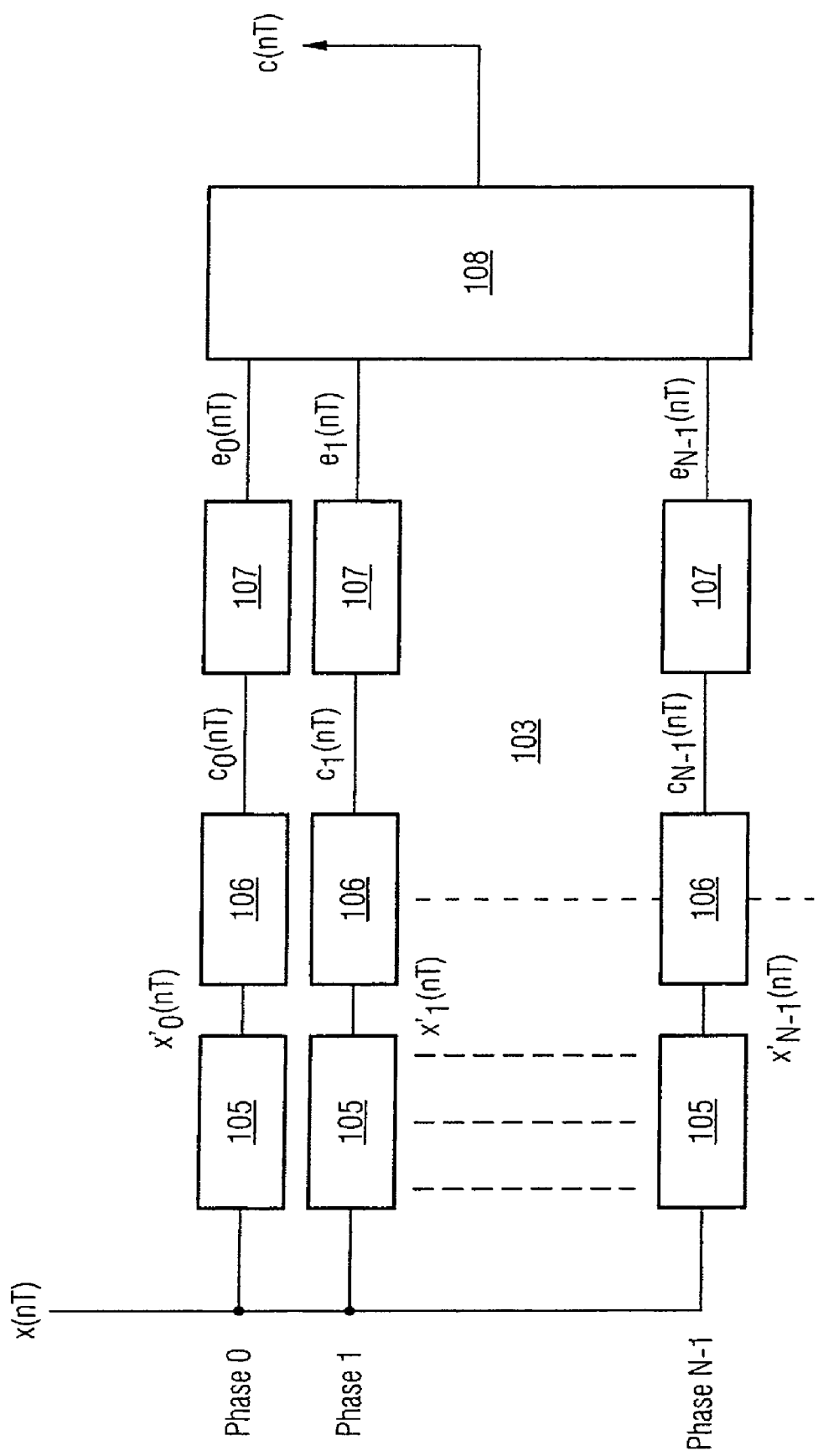
FIG. 3 shows a correction prediction device of the device of FIG. 1.

FIG. 3 shows the correction prediction device of the device of FIG. 1. The correction prediction device 103 exhibits for each phase a prediction device 105, a correction signal generating device 106 and a phase correction device 107. The correction prediction device 103 also exhibits a correction combining device 108. The prediction devices 105 generate for each associated phase p a sequence $x_p'$(nT) of a predictive signal. The respective sequence $x_p'$(nT) of the predictive signal is compared with a threshold value in a correction signal generating device 106 following in each case. When the symbol sequence or sequence $x_p'$(nT) of the predictive signal exceeds the threshold value, the respective correction signal generating device 106 calculates a sequence $c_p$(nT) of a single-phase correction signal. For a phase p, the sequence $c_p$(nT) of the single-phase correction signal can be calculated according to the following rule:

if $|x_p'(nT)|$>threshold value $c_p(nT)=x_p'(nT)*(1-\text{threshold value}/|x_p'(nT)|)$ else $c_p(nT)=0$     (9)

The sequence $c_p$(nT) of a single-phase correction signal is calculated on the basis of the sequence $x_p'$ (nT) of the predictive signal for a first point in the transmitter at which the reduction in the dynamic range is really desired and needed, and not on the basis of the sequence x(n) of the input signal at the second point. Such a first point is, e.g., a point which differs from the input of the shape filter in FIG. 14, i.e., for example, the output of the shape filter, the output of the mixer, the output of the digital/analogue converter or the output of the power amplifier in FIG. 14A. The phase correction devices 107 are used for generating a sequence $e_p$(nT), equivalent to a respective sequence $c_p$(nT) of a single-phase correction signal, of a transformed single-phase correction signal at baseband level. For each phase 0, 1, . . . , N−1, a different transformation is used in a phase correction device 107.

The phase correction devices 107 supply N sequences $e_p$(nT) of transformed single-phase correction signals to the correction combining device 108. It is very probable that more than one sequence $e_p$(nT) of the transformed single-phase correction signals will differ from zero at the same time. In FIG. 2, for example, the sequences $c_1$(nT) and $c_3$(nT) of the single-phase correction signals of phases 1 and 3 are simultaneously unequal to zero during the symbol x(nT). The correction combining device 108 combines the sequences of the transformed single-phase correction signals with one another in order to generate the sequence c(nT) of the correction signal.

Figure 4:
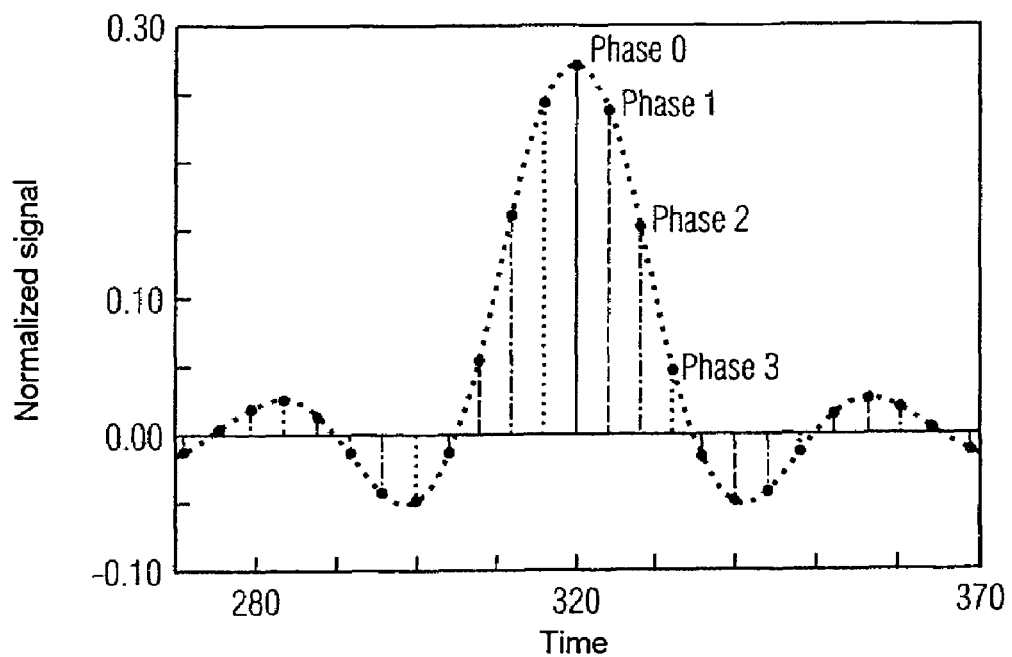
FIG. 4 shows a prediction function of a prediction device in FIG. 3.

In the device in FIG. 1 and FIG. 3, the reduction in the dynamic range of a signal can be performed for a first point which corresponds to the output of the shape filter in FIG. 14A. In this respect, FIG. 4 shows the typical impulse response of the shape filter of FIG. 14B. The symbol interval T of the sequence x(nT) of the input signal is divided into four phases according to FIG. 2. For each of the phases, it is possible to sample an equivalent impulse response, namely the samples in the continuously drawn, dashed, dot-dashed and dotted illustration in FIG. 4 for phases 0, 1, 2 and 3. In the correction prediction device 103 of FIG. 3, the N prediction devices 105 can be finite impulse response filters (FIR filters) which in each case exhibit the corresponding equivalent impulse response. The N equivalent impulse responses are $h_0$(kT), $h_1$(kT), . . . , $h_{N-1}$(kT). The sequence $x_p'$ (nT) of the predictive signal for a phase p is, therefore:

$$x_p'(nT) = \sum_k x(kT) \cdot h_p(kT - nT) \quad (10)$$

The phase correction devices 107, which are in each case used for phases 1 to N−1 in FIG. 3, derive sequences $e_p$(nT) of transformed single-phase correction signals from the sequences $c_p$(nT) of the single-phase correction signals. The sequences $e_p$(nT) of the transformed single-phase correction signals correspond to the actual distortion introduced into a baseband signal. The minimization of the energy of these transformed single-phase correction signals therefore corresponds to the minimization of the distortion introduced. The phase correction devices 107, in one example, exhibit/comprise in each case an FIR filter with an impulse response which is equal to the time-inverted impulse response $h_p$(kT) which is used in a respective prediction device 105 and is normalized by the energy of the impulse response $h_p$(nT) of the respective prediction device 105. The impulse response of the FIR filter of the phase correction device 107 for phase p is, therefore:

$$e_p(nT) = \sum_k c_p(kT) \cdot \frac{h_p(-(kT - nT))}{\sum_m (h_p(mT))^2} \quad (11)$$

The symbol sequence $e_p$(nT) of the transformed single-phase correction signal has a minimum amount of energy.

The N prediction devices 105 generate for each phase p the sequence $x_p'$ (nT) of the predictive signal according to equation 10. Each sequence $x_p'$ (nT) of a predictive signal is then checked according to rule 9 in a respective correction signal generating device 106 which calculates a sequence $c_p$(nT) of a single-phase correction signal for a respective phase p. According to equation 11, the sequence $c_p$(nT) of each single-phase correction signal is distributed by the respective phase correction device 107 over a number of values or symbols of the sequence $e_p$(nT) of the transformed single-phase correction signal. The correction combining device 108 combines the N sequences $e_p$(nT) of the transformed single-phase correction signals to form a single sequence c(nT) of a correction signal. It is possible that corrections are needed simultaneously in more than one phase. In FIG. 1, the sequence c(nT) of the correction signal is subtracted in the addition device 104 to form the sequence x(nT) of the input signal, delayed by the delay device 102, in order to reduce the dynamic range of the signal at the first point in the transmitter. The delay device 102 takes into consideration the processing time D due to the two FIR filters of the respective prediction device 105 and phase correction device 107.

The correction combining device 108, in one example, combines the sequences $e_p(nT)$ of the transformed correction signals in accordance with the following non-linear rule:

c[i].re=$e_1$[i].re c[i].im=$e_1$[i].im if (ABS(c[i].re<ABS($e_2$[i].re)) c[i].re=$e_2$[i].re

. . .

if (ABS(c[i].re<ABS($e_N$[i].re)) c[i].re=$e_N$[i].re if (ABS(c[i].im<ABS($e_2$[i].im)) c[i].im=$e_2$[i].im

. . .

if (ABS(c[i].im<ABS($e_N$[i].im)) c[i].im=$e_N$[i].im    (12)

In rule 12, essentially, the real component with the maximum amplitude is selected from the real components (.re) of sequences $e_x$[i] of the transformed single-phase correction signals and the imaginary component with the maximum amplitude is selected from the imaginary components (.im) of sequences $e_x$[i] of the transformed single-phase correction signals. Therefore, rule 12, which represents a pseudo code, already takes into consideration the use of complex-valued signals.

As an alternative, the correction combining device 108 calculates the sequence c(nT) of the correction signal from a simple addition of sequences $e_p(nT)$ of the transformed single-phase correction signals.

Figure 5:
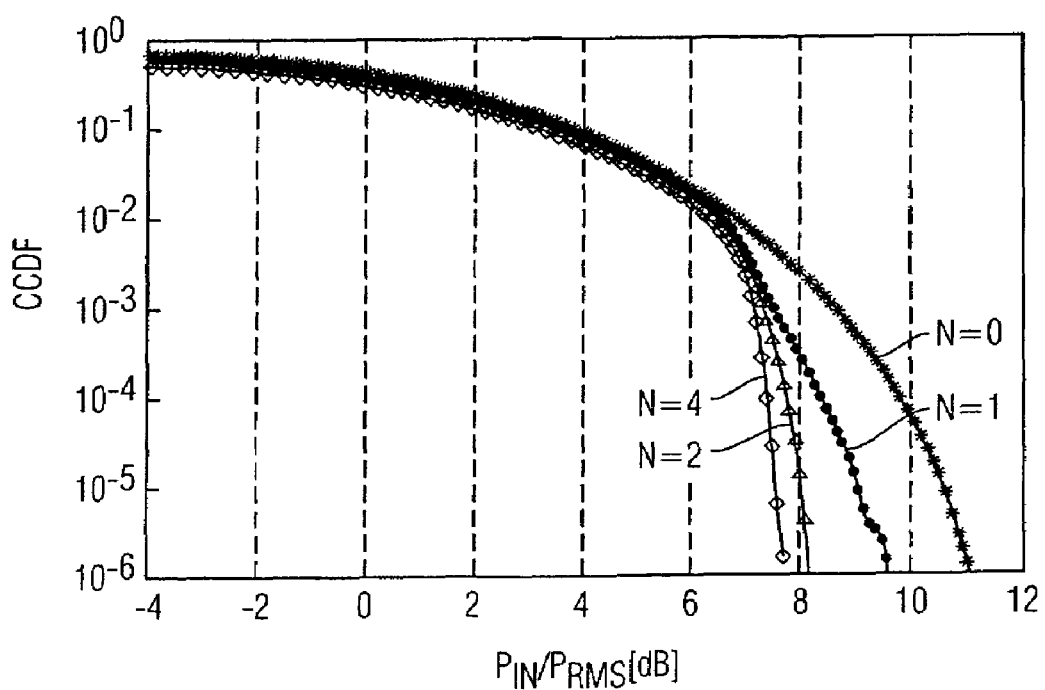
FIG. 5 shows a complementary cumulative distribution function of an output signal in the application of the invention.

FIG. 5 shows the complementary cumulative distribution function (CCDF) of the sequence of the output signal of the shape filter in FIG. 14 which is obtained after the reduction of the dynamic range with N=1, 2 and 4 prediction devices 105 in FIG. 3 and without reduction in the dynamic range (N=0). The prediction functions used are the impulse responses for phase 0 of FIG. 4 with a prediction device 105, for phases 0 and 2 with two prediction devices 105 and for phases 0 to 3 with four prediction devices 105. Since the impulse response for phase 0 is very similar to a dirac pulse, it can be assumed that the results for the case of a (N=1) prediction device are also valid for the known solution of FIG. 15.

Figure 15:
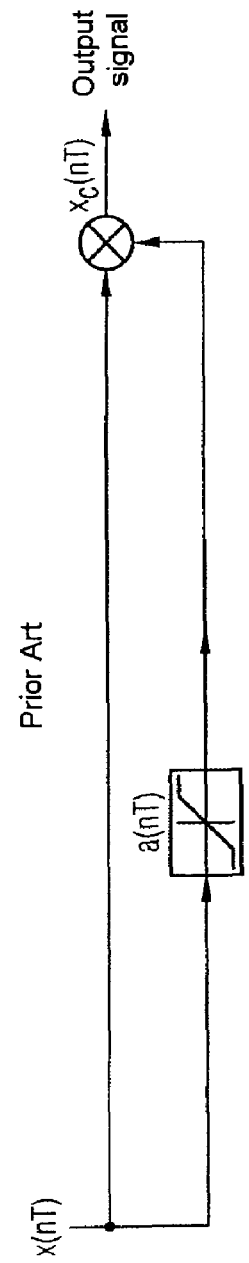
FIG. 15 shows a precompensation device for the known transmitter of FIG. 14B.

The distribution function in FIG. 5 shows that, in order to obtain the same reduction in the dynamic range as in the case of the precompensation device of FIGS. 14B and 15, the threshold value used can be greater (1 dB or more) with the correction prediction device 103 in FIG. 3 with 2 or 4 prediction devices 105 and the amount of distortion generated by the correction prediction device 103 is, therefore, smaller which corresponds to a better characteristic in the reduction of the dynamic range.

When FIR filters are used, the prediction devices 105 of the correction prediction device 103 in FIG. 3 can be considered to be polyphase filters and implemented by a single interpolation filter with a factor of N if the phases within a symbol interval T are equally spaced apart. Due to the time-inverted impulse response, the phase correction devices 107 of FIG. 3 also resemble a matched filter with regard to the corresponding prediction device 105. From these considerations, a further illustrative embodiment of a device for reducing the dynamic range of a signal can be derived.

Figure 6:
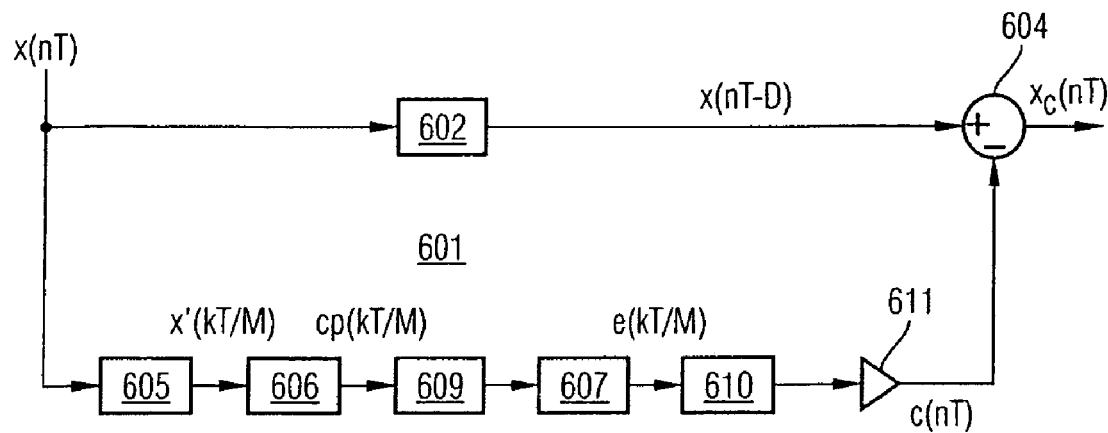
FIG. 6 shows a further illustrative embodiment of a device according to the invention.

FIG. 6 shows this further illustrative embodiment of a device for reducing the dynamic range of a signal. The device is used for reducing the dynamic range of a signal at a first point in a signal processing direction in a transmitter of a communication system. The device is arranged at a second point along the signal processing direction within the transmitter, which is located in front of the first point.

The communication system can be a mobile radio system and, as an alternative, can be any wireless communication system such as, e.g., a wireless local area network (WLAN) or a wire-connected communication system. The transmitter can be a transmitter of a base station of a UMTS mobile radio system. Signals in the transmitter can be generated by a symbol source which maps bit streams onto sequences of symbols by means of the QPSK modulation method and distributes these to physical channels by means of the WCDMA multiple access method. The device can be used in a transmitter according to FIG. 14A. The first point is, e.g., the output of the shape filter, of the mixer, of the digital/analogue converter or of the power amplifier in FIG. 14A. The second point is, for example, the output of the symbol source in FIG. 14A.

The device 601 exhibits a first delay device 602, an addition device 604, an interpolation filter 605, a correction signal generating device 606, a second delay device 609, a matched filter 607, a decimation device 610 and an amplifier 611. An input signal is applied to an input of the device 601. A sequence x(nT) of the input signal is fed into the interpolation filter 605 which predicts a sequence x'(kT/M) of a signal at a particular point within the transmitter with an M-times higher rate. From the sequence x'(kT/M) of the predictive signal or, respectively, the output signal of the interpolation filter 605, a sequence cp(kT/M) of a polyphase correction signal is derived by means of the correction signal generating device 606, in one example, with equivalent use of equation 9. The subsequent delay device 609 adjusts the sequence cp(kT/M) of the polyphase correction signal to the optimum sampling phase. A sequence of an output signal of the delay device 609 is fed into the matched filter 607 and a sequence e(kT/M) of a transformed polyphase correction signal of the matched filter 607 is down-sampled to a symbol rate by a factor M in the decimation device 610. The down-sampled sequence is adjusted by the amplifier 611 to the correct level which outputs a sequence c(nT) of a correction signal. In the first delay device 602, a sequence x(nT−D) of a delayed input signal is generated from the sequence of the input signal. The delay D takes into consideration the processing time of the interpolation filter 605, of the correction signal generating device 606, of the first delay device 609, of the matched filter 607, of the decimation device 610 and of the amplifier 611. The sequence c(nT) of the correction signal is subtracted from the sequence x(nT−D) of the delayed input signal in the addition device 604 in order to generate a sequence $x_c$(nT) of a corrected signal or, respectively, output signal which effects a signal with a reduced dynamic range at the first point in the transmitter following the device 601.

Figure 7:
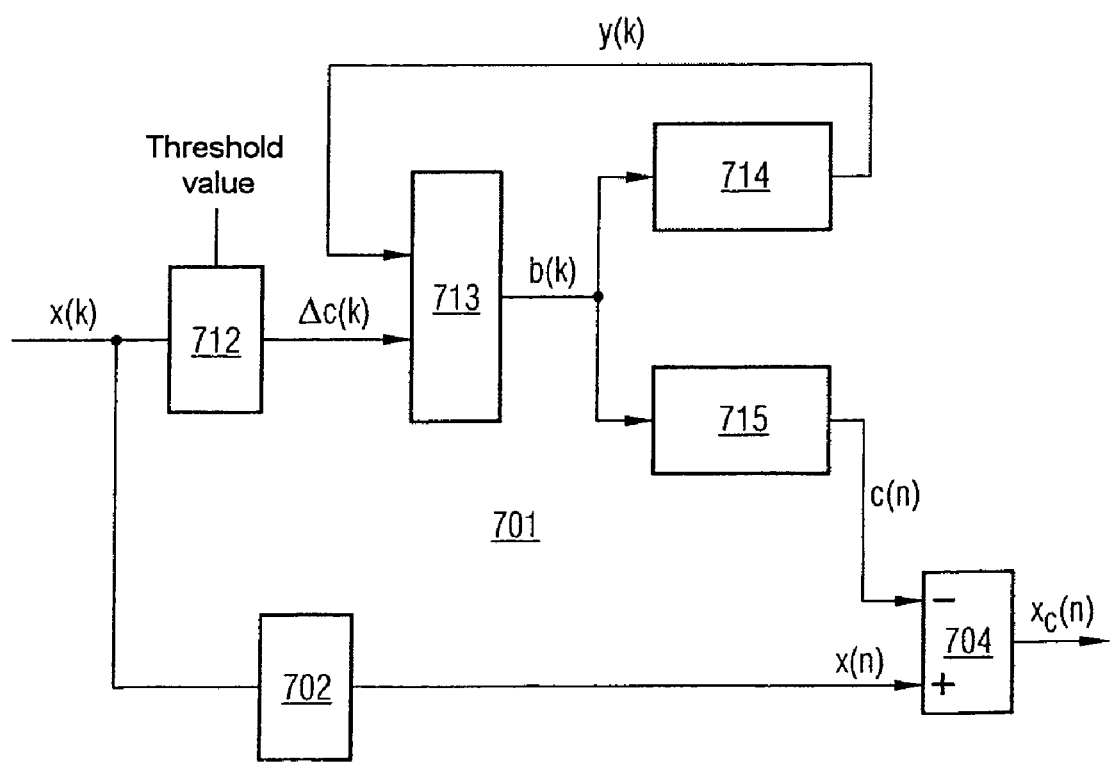
FIG. 7 shows a further illustrative embodiment of a device according to the invention.
Figure 16:
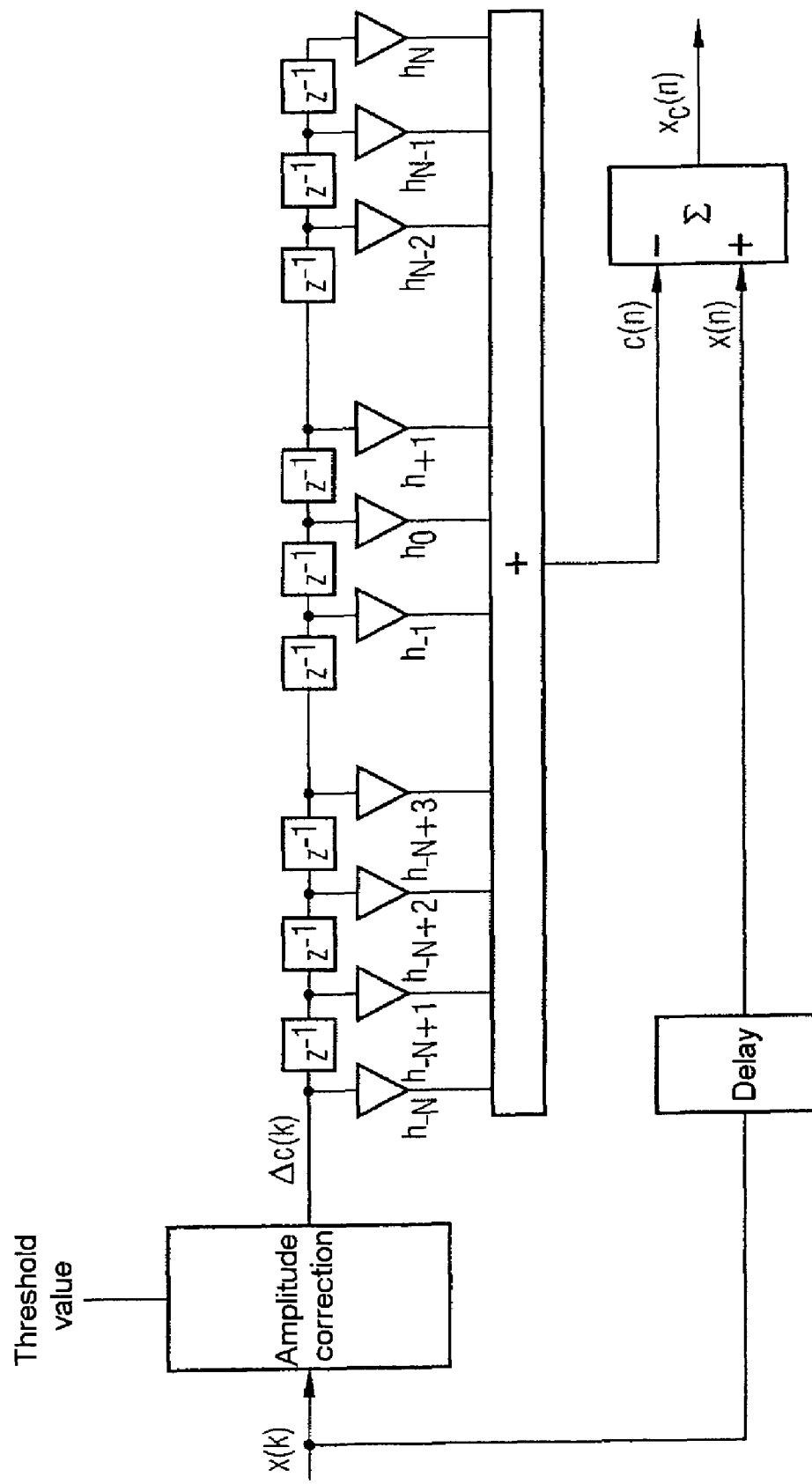
FIG. 16 shows a known device for reducing the dynamic range of an OFDM signal.
Figure 17:
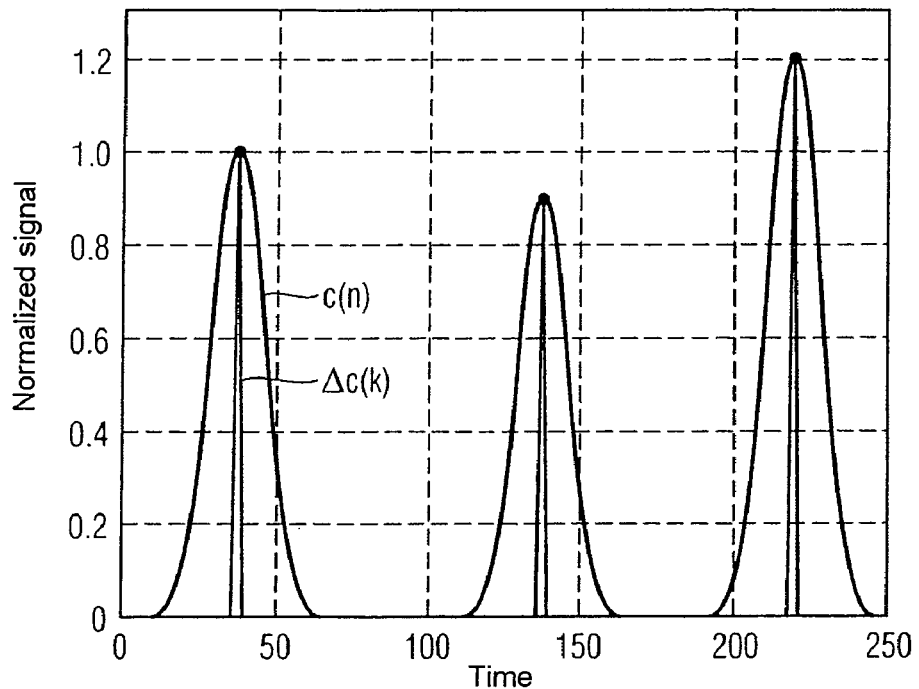
FIG. 17 shows a correction signal of the device of FIG. 16.
Figure 18:
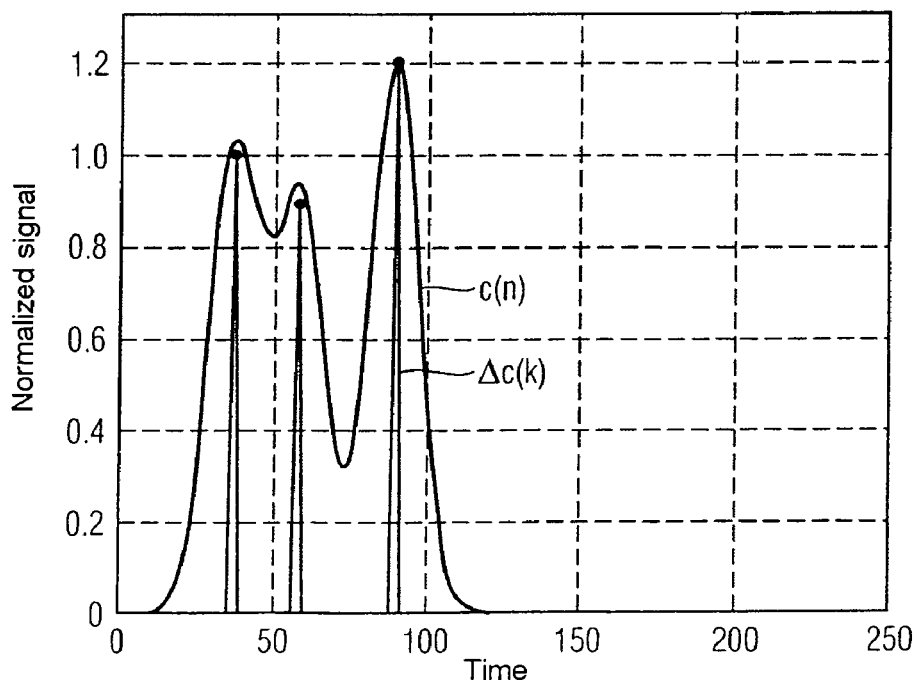
FIG. 18 shows a correction signal of the device of FIG. 16.
Figure 19:
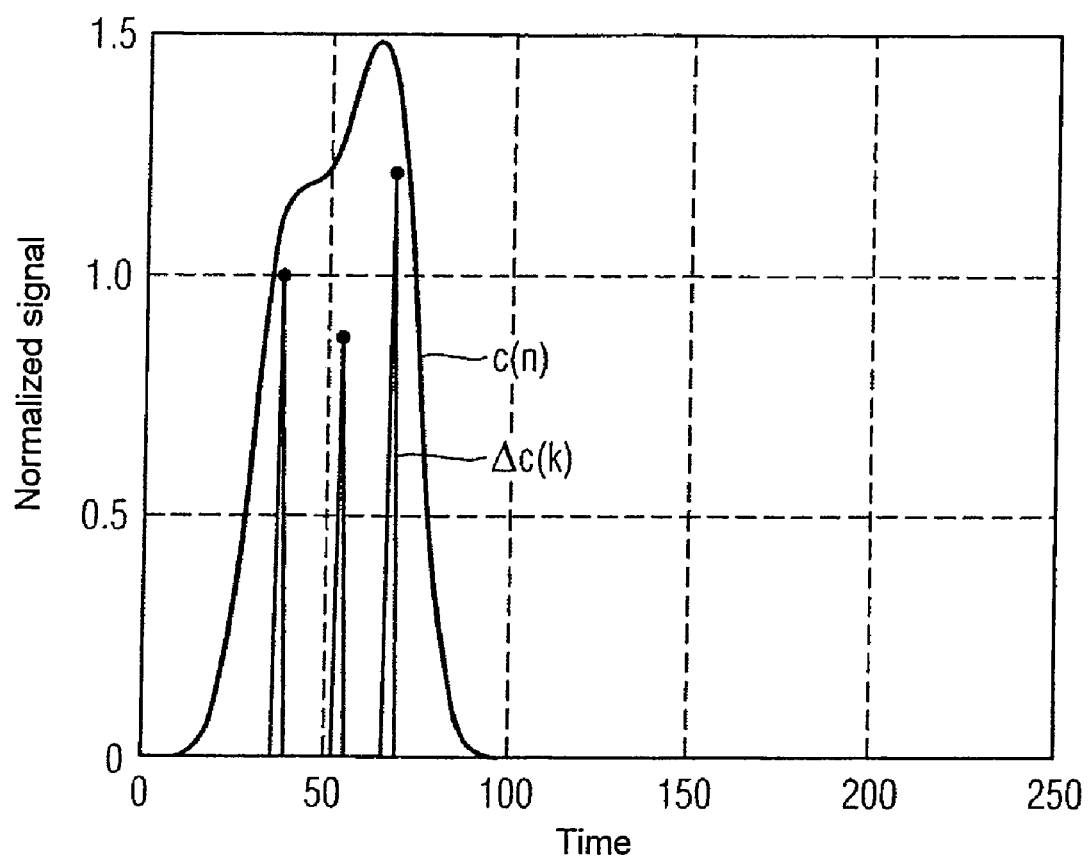
FIG. 19 shows a correction signal of the device of FIG. 16.

FIG. 7 shows a further illustrative embodiment of a device for reducing the dynamic range of a signal. The device improves the pulse generation of the device in FIG. 16, known from T. May et al. and N. Hentati et al. The signal can be a signal at a particular point along a signal processing direction within a transmitter.

The communication system can be a mobile radio system and, as an alternative, can be any wireless communication system such as, e.g., a wireless local area network (WLAN), or a wire-connected communication system. The transmitter can be a transmitter of a base station of a UMTS mobile radio system. Signals in the transmitter are generated by a symbol source which maps bit streams onto sequences of symbols by means of the QPSK modulation method and distributes them to physical channels by means of the WCDMA multiple access method. As an alternative, the signals in the transmitter are OFDM signals. The device can be used in a transmitter according to FIG. 14A. The particular point is, e.g., the output of the shape filter, of the mixer, of the digital/analogue converter or of the power amplifier in FIG. 14A.

The device 701 exhibits an amplitude correction signal generating device 712, a processing device 713, a feedback filter 714, a forward filter 715, a delay device 702 and an addition device 704. To an input of the device 701, a sequence x(n) of an input signal is applied which is, e.g., a sequence of a signal at a particular point in the transmitter, the dynamic range of which is to be reduced. The delay device 702 takes into consideration the processing time in the amplitude correction signal generating device 712, in the processing device 713 and in the forward filter 715 and generates a sequence x(n) of a delayed input signal from the sequence x(k) of the input signal. A sequence c(n) of a correction signal is subtracted in the addition device 704 from the sequence x(n) of the delayed input signal generated by the delay device 702 in order to generate a sequence $x_c(n)$ of a corrected output signal of the device 701 with a reduced dynamic range which is output at an output of the device 701. The amplitude correction signal generating device 712 generates from the sequence x(k) of the input signal a sequence Δc(k) of an amplitude correction signal according to equation 5. The forward filter 715 is used for generating suitable pulses h(.) and by this means to calculate a sequence c(n) of a correction signal according to equation 6 from a sequence b(k) of a modified amplitude correction signal of the processing device 713. The feedback filter 714 generates from the sequence b(k) of the modified amplitude correction signal of the processing device 713 a sequence y(k) of an output signal which represents the value of an old or preceding pulse of the sequence c(n) of the correction signal which overlaps a new or current pulse of the sequence c(n) of the correction signal when the current input signal is positioned at the position of the main coefficient $h_0$ in the delay chain.

The processing device 713 uses the sequence y(k) of the output signal of the feedback filter 714 for checking whether the actual value of the tail of a preceding pulse of the sequence c(n) of the correction signal is greater than the desired value of the sequence Δc(k) of an amplitude correction signal which is generated by the amplitude correction signal generating device 712. The processing device 713 has the function of generating from the sequence Δc(k) of the amplitude correction signal a sequence b(k) of a modified amplitude correction signal so that the forward filter 715 does not produce overcorrection as is the case for the device of FIG. 16. The processing device 713, in one example, generates the sequence b(k) of the modified amplitude correction signal in accordance with the following pseudo C code:

```
abs_y = POW(y[k]); /*power of the tail */
abs_c = POW(Δc(k)); /*power of the amplitude correction
signal */
if (abs_y > abs_c {/* if overcorrected, then no action */
b[k].re=0.0;
b[k].im=0.0;
}
else { /* adding only the difference to the desired value
*/
b[k].re=Δc(k).re − y[k].re;
b[k].im=Δc(k).im − y[k].im;
}                                                             (13)
```

In this case, it is taken into account in the pseudo C code that the input signals are complex-valued. The forward filter 715 can be an FIR filter or an infinite impulse response filter (IIR filter). The feedback filter 714 can be an FIR filter having K coefficients or taps, or an IIR filter.

Figure 8:
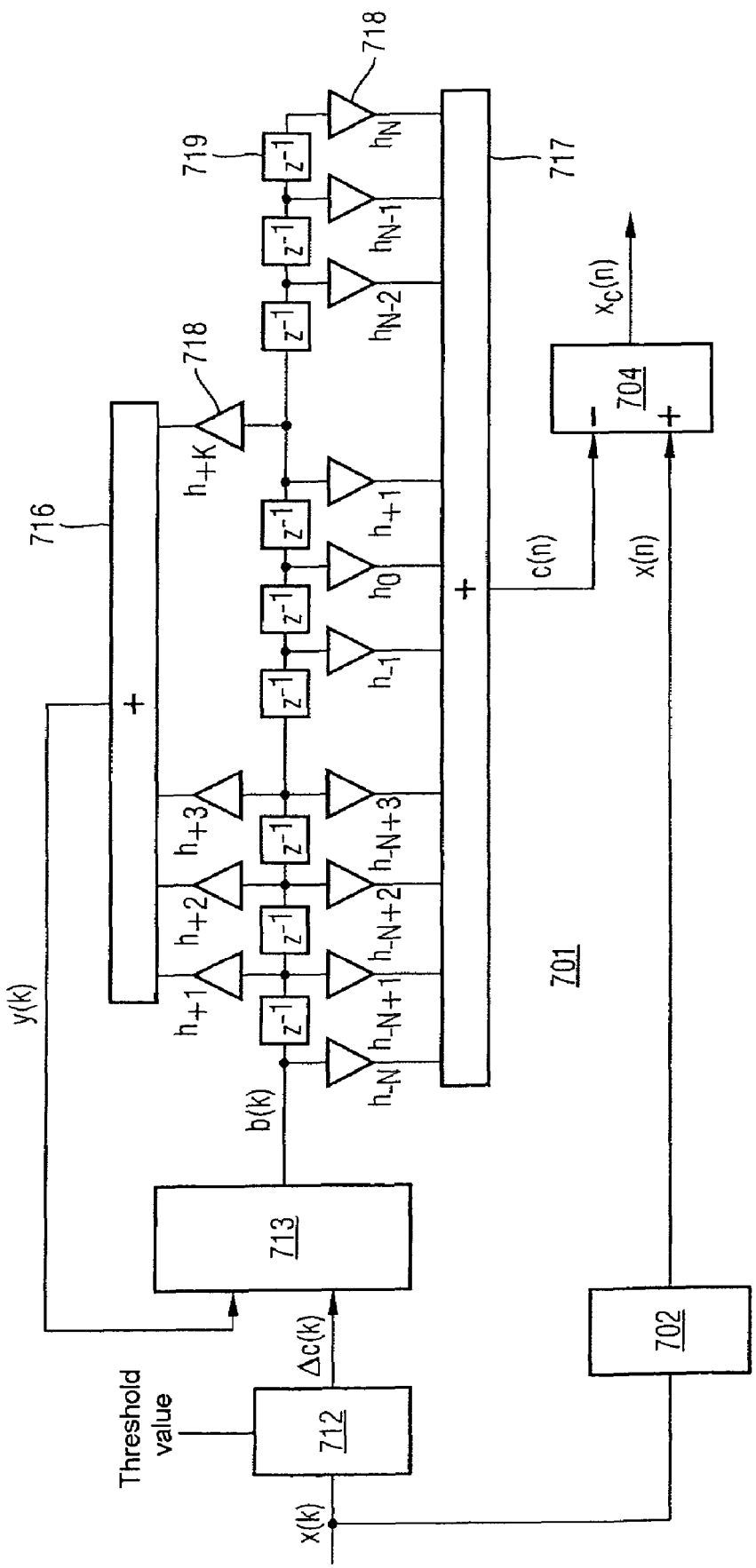
FIG. 8 shows a detailed representation of the device of FIG. 7.

FIG. 8 shows in detail the device for reducing the dynamic range of a signal of FIG. 7, the forward filter and the feedback filter being FIR filters. The forward filter and the feedback filter are implemented in a single FIR filter with a first and a second addition device 716 and 717, coefficient multiplication devices 718 which are connected to the addition device 716 and 717, respectively, and a chain of delay elements 719 which are connected to the coefficient multiplication devices 718. The feedback filter, therefore, uses some of the delay elements 719 of the forward filter. The K coefficients $h_{+1} \ldots h_{+K}$ of the feedback filter are the K coefficients of the forward filter which follow the main coefficient $h_0$. The device of FIG. 8 is suitable both for low-pass pulses (real filter) and for band-pass filters in which complex filters are used.

When a number of carrier signals are processed, the following complex pulse is used in the device of FIG. 8:

$$h_{NC}(n)=h(n)\cdot e^{j2\pi f_1 n}+h(n)\cdot e^{j2\pi f_2 n}+ \ldots +h(n)\cdot e^{j2\pi f_N n} \quad (14)$$

h(.) is the low-pass pulse which is used for the case with a single carrier signal, and $f_1, f_2, \ldots, f_N$ are the frequencies of the N carrier signals.

Figure 9:
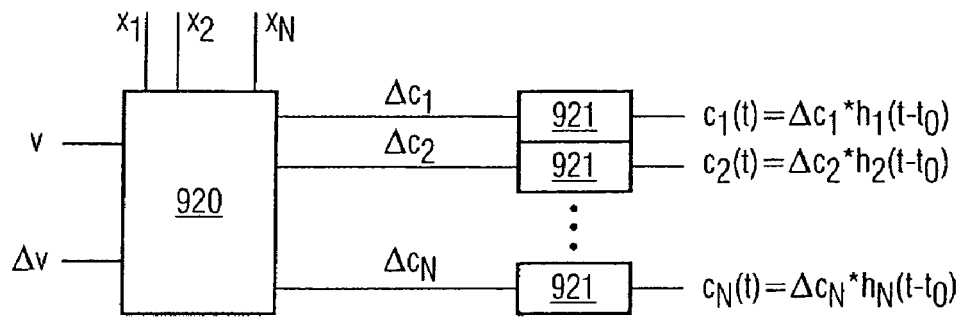
FIG. 9 shows an illustrative embodiment of a correction pulse generator according to the invention.
Figure 20:
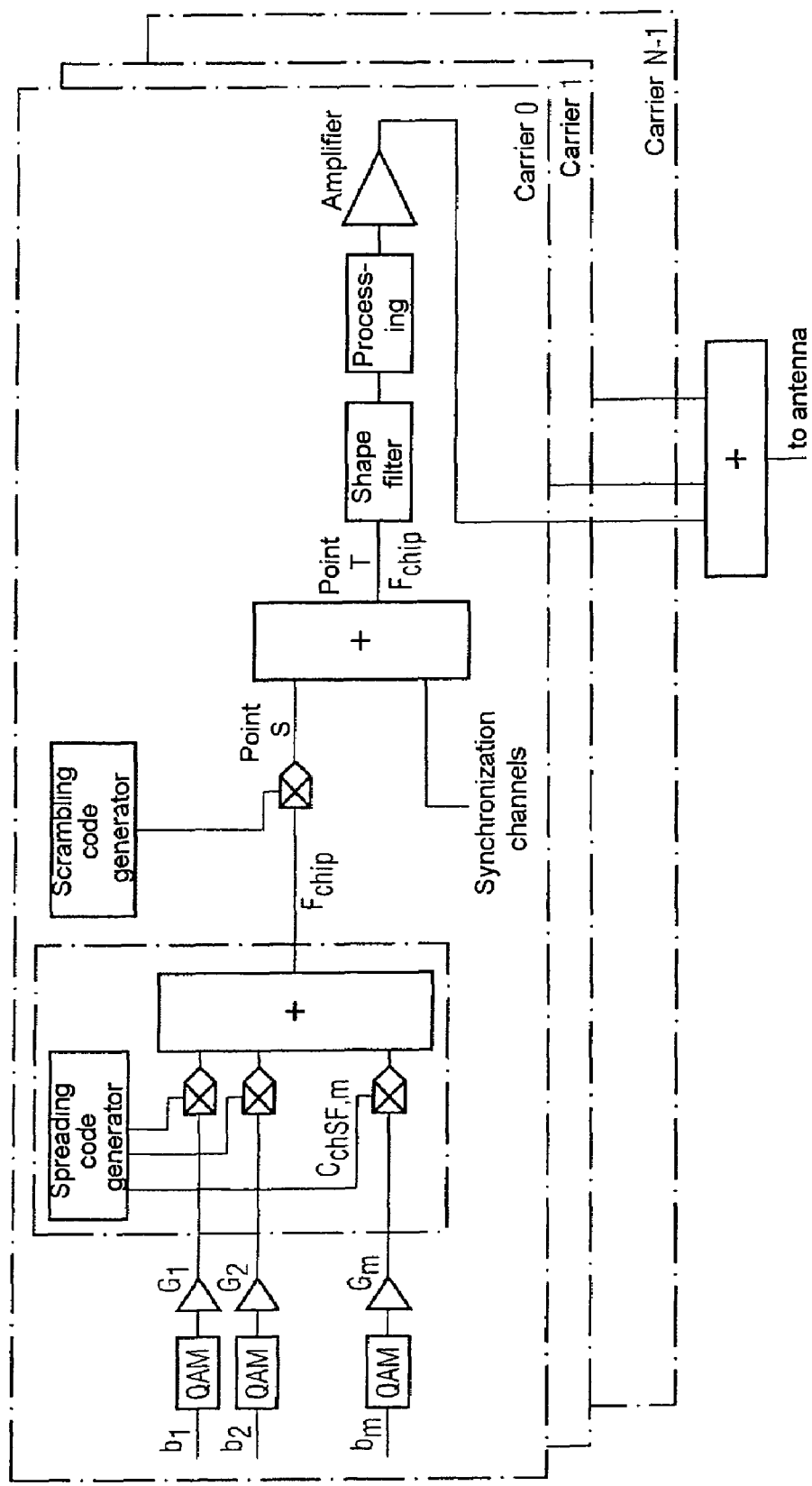
FIG. 20 shows a known transmitter for a number of carrier signals.
Figure 21:
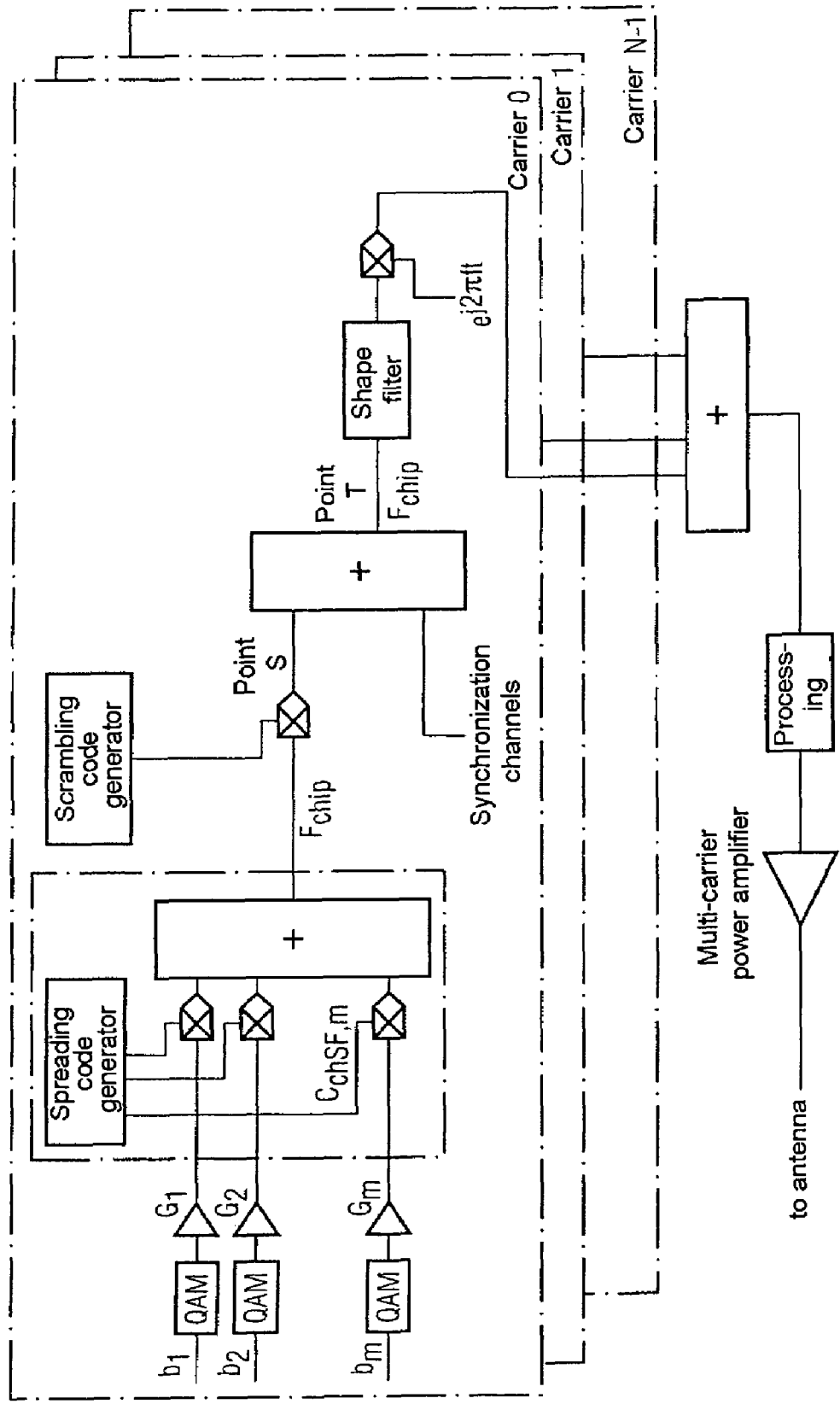
FIG. 21 shows a known transmitter for a number of carrier signals.
Figure 22:
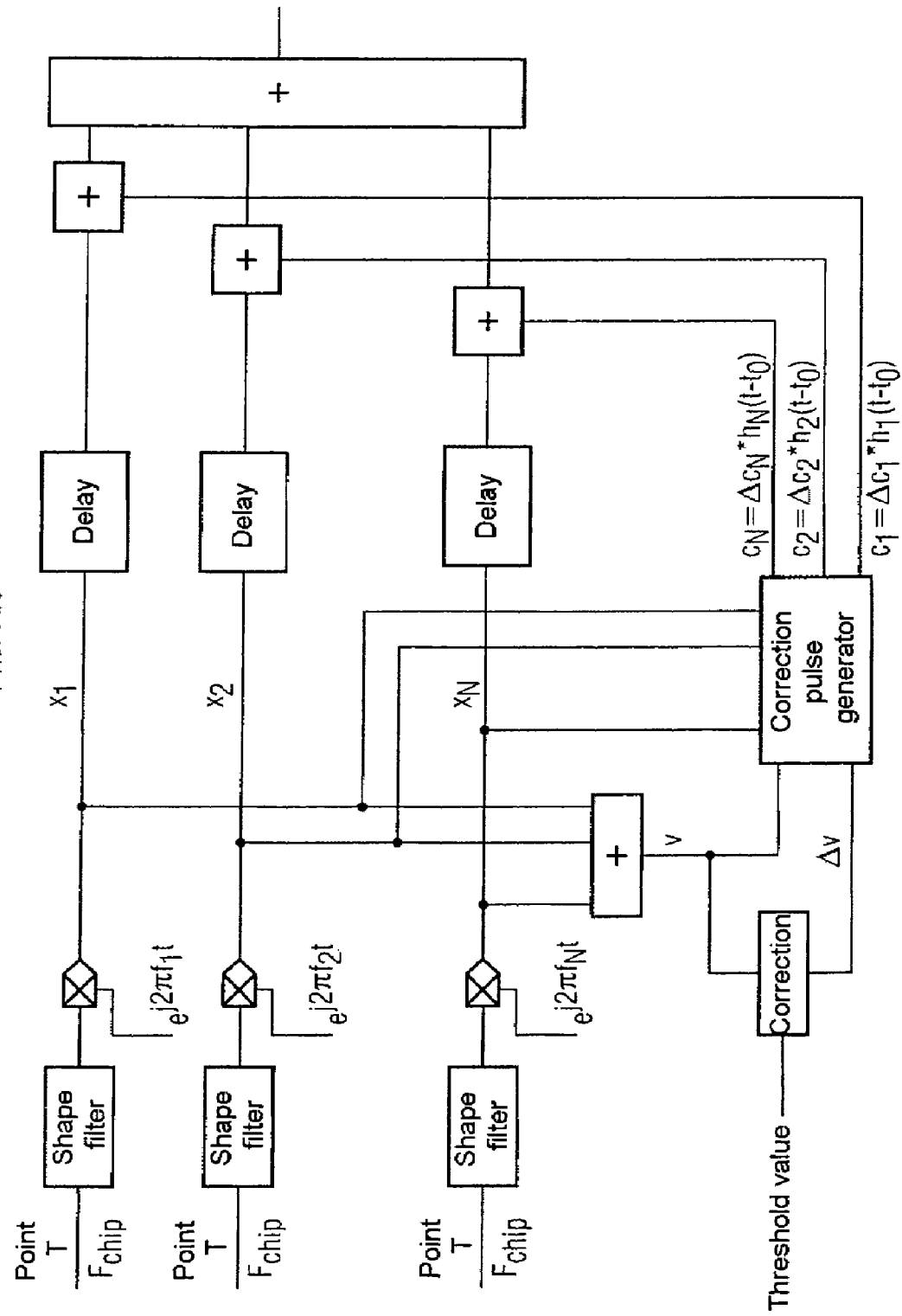
FIG. 22 shows a known device for reducing the dynamic range of a multi-carrier signal.

FIG. 9 also shows an illustrative embodiment of a correction pulse generator according to the invention for a device for reducing the dynamic range of a multi-carrier signal in FIG. 22. The device can be used in a transmitter according to FIGS. 20 and 21. The correction pulse generator exhibits a correction distribution device 920 and N pulse generators 921. The correction distribution device 920 distributes a multi-carrier amplitude correction signal Δv to the N carrier signals in dependence on a reference multi-carrier signal v, a multi-carrier correction signal Δv and/or single carrier signals $x_1, x_2, \ldots, x_N$ in FIG. 20, and generates single-carrier amplitude correction signals $\Delta c_1, \Delta c_2, \ldots, \Delta c_N$ allocated to the carrier signals. The N single-carrier amplitude correction signals $\Delta c_1, \Delta c_2, \ldots, \Delta c_N$ stimulate the N pulse generators 921 which generate modulated pulses $h_1(t-t0), h_2(t-t0), \ldots, h_N(t-t0)$, or single-carrier correction signals $c_1, c_2, \ldots, c_N$, respectively, with the single-carrier amplitude correction signals $\Delta c_1, \Delta c_2, \ldots, \Delta c_N$. Each of the complex pulses $h_1, h_2, \ldots, h_N$ used in a pulse generator 921 is different and exhibits spectral characteristics which are similar to the spectral characteristics of the corresponding carrier signal. The complex pulses are, in one example, band-pass pulses.

Figure 10:
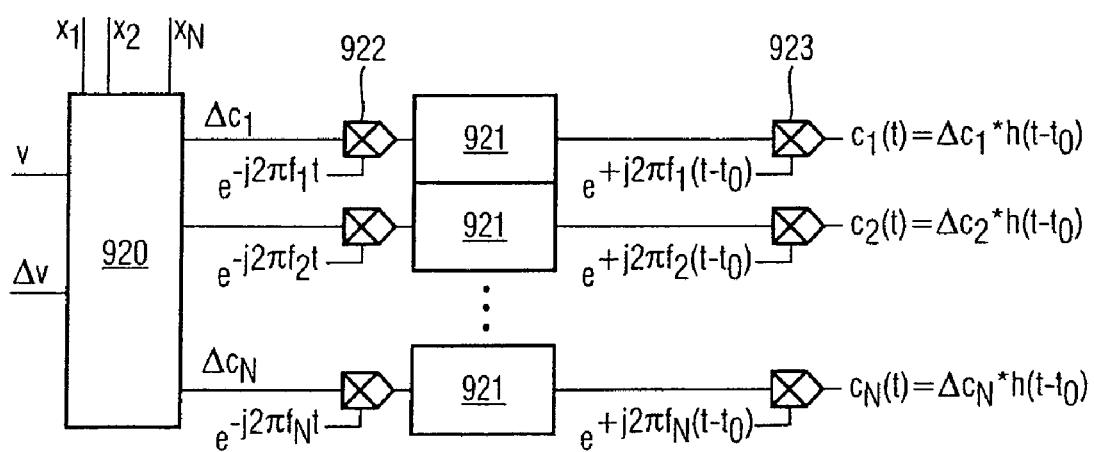
FIG. 10 shows a further illustrative embodiment of a correction pulse generator according to the invention.
Figure 12:
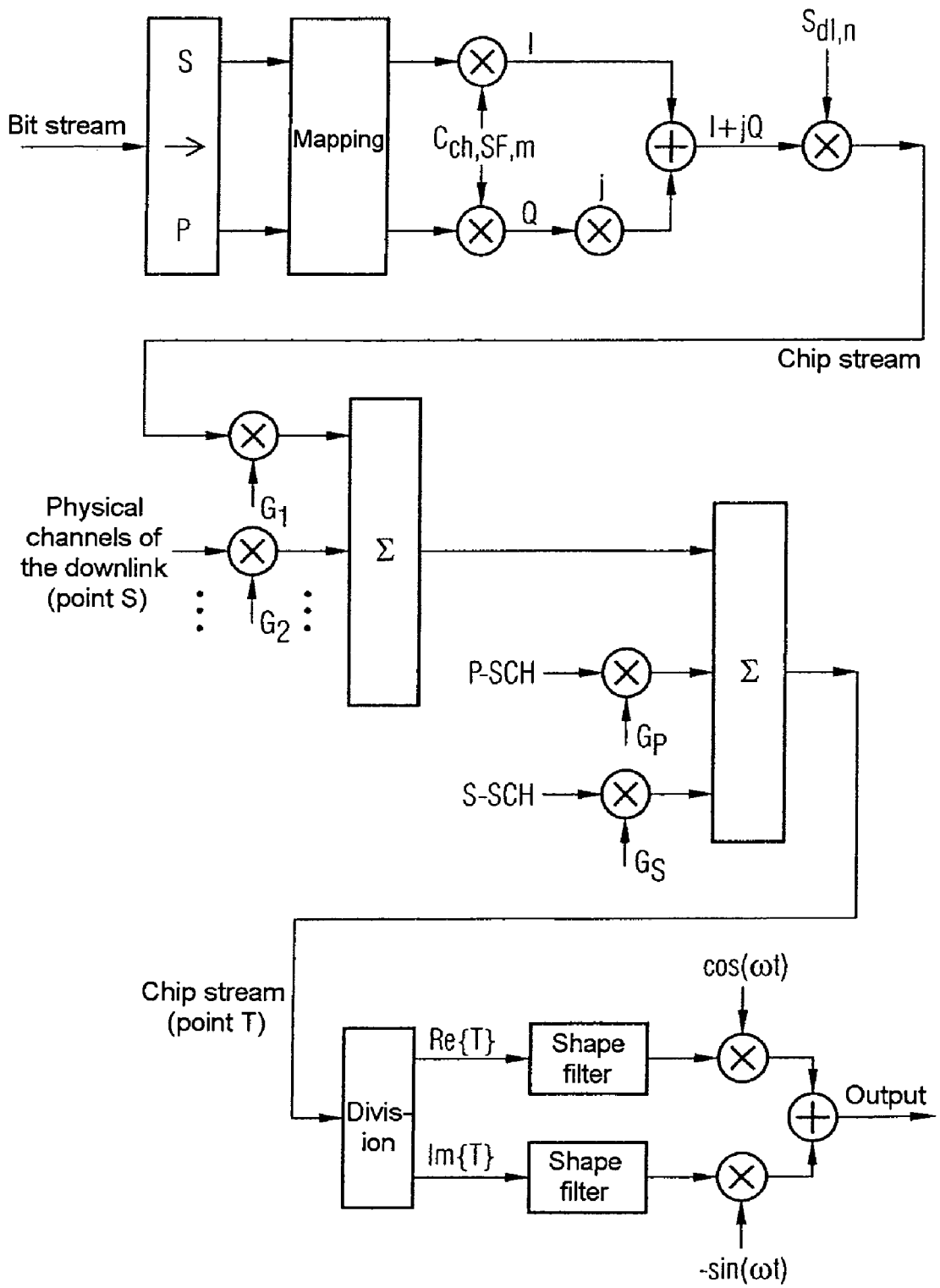
FIG. 12 shows a known transmitter.
Figure 13:
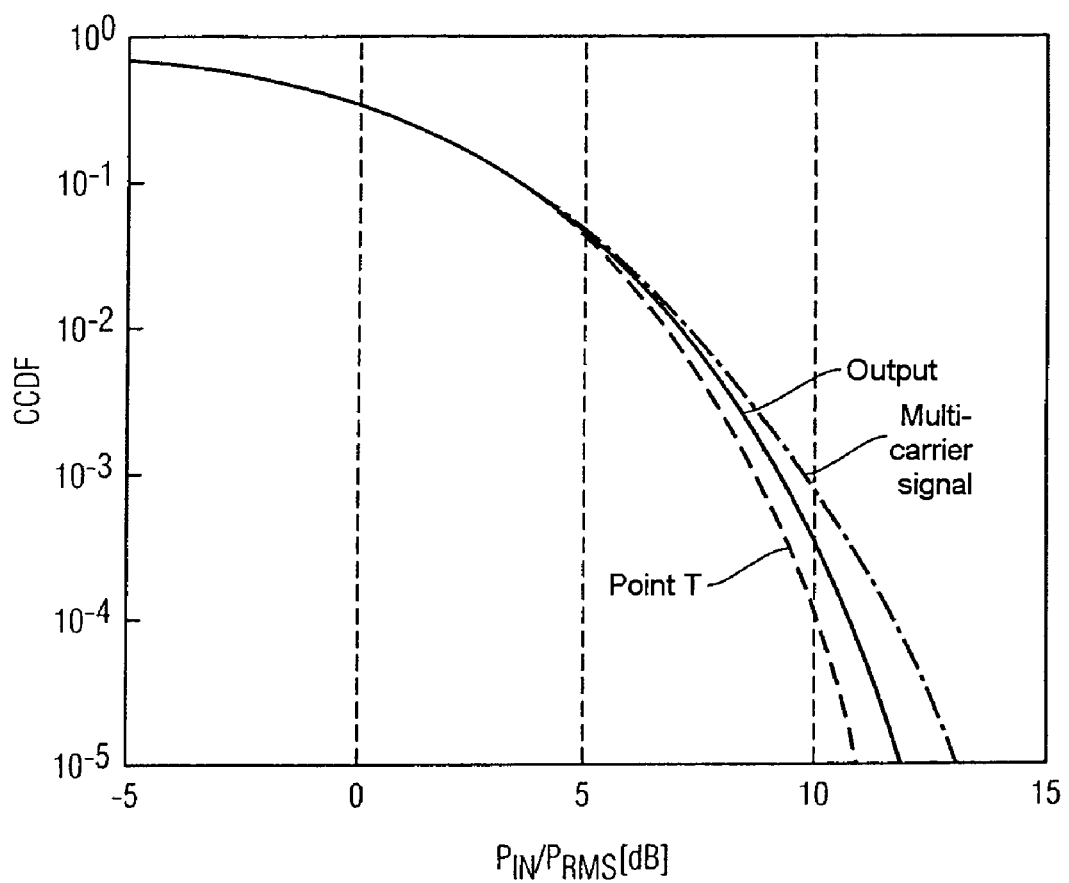
FIG. 13 shows a complementary cumulative distribution function of a WCDMA signal of the known transmitter of FIG. 12.

FIG. 10 shows a further illustrative embodiment of a correction pulse generator according to the invention. In comparison with the correction pulse generator from FIG. 9, the correction pulse generator also exhibits first mixers 922 and second mixers 923. The first mixers 922 are used for down-converting the single-carrier amplitude correction signals $\Delta c_1, \Delta c_2, \ldots, \Delta c_N$ into the baseband. In all pulse generators 921, the same low-pass pulse h(.), e.g. a real pulse, is used for all carriers. The second mixers 923 are used for up-converting the generated pulses to the respective carrier frequency in order to obtain the appropriate spectral occupancy. The second mixers 923 take into consideration the processing delay $t_0$.

From FIGS. 9 and 10, it is clear that wherever there is a correction pulse generator, it can be replaced by the correction pulse generators according to FIGS. 9 and 10 of the present invention as a result of which overcorrection is avoided and the performance of reducing the dynamic range is improved.

In contrast to the known single-carrier amplitude correction signals of equation 7, the correction signals $$\Delta c_1 = \alpha_1 \cdot \Delta v, \, \Delta c_2 = \alpha_2 \cdot \Delta v, \, \ldots \, \Delta c_N = \alpha_N \cdot \Delta v, \qquad (15)$$

are used in the correction distribution device 920 in FIGS. 9 and 10. The coefficients $\alpha_1, \alpha_2, \ldots \alpha_N$ are real values with a sum equal to 1.

Figure 23:
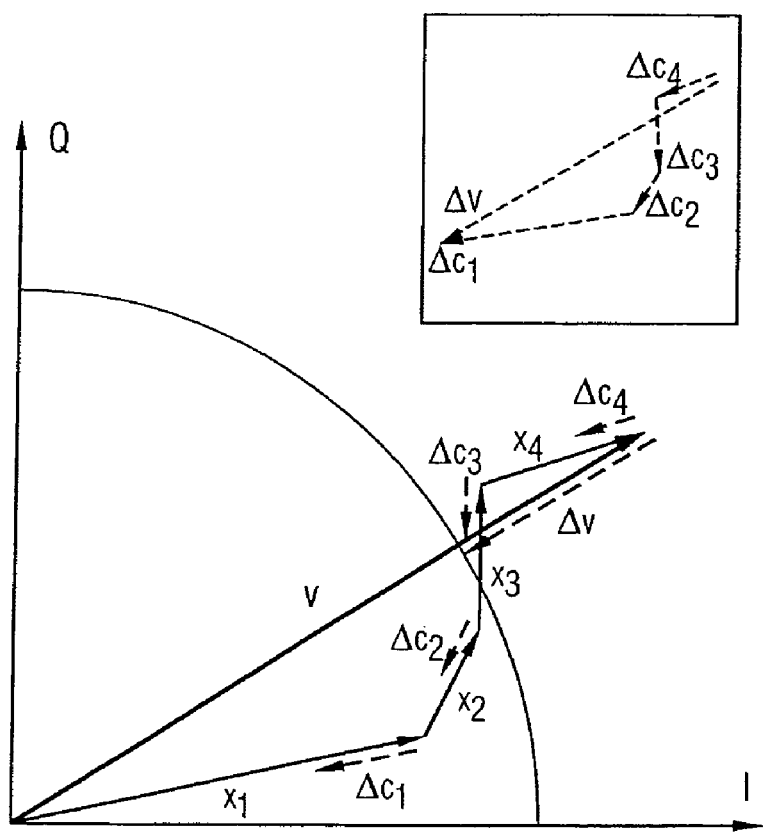
FIG. 23 shows a diagram which represents the effect of the device of FIG. 22.

FIG. 11 shows on the right the choice according to the invention of the single-carrier amplitude correction signals in comparison with the known choice of FIG. 23 for the case of N=4 carriers. The improvement is clearly visible. The sum of the amplitudes of the four vectors of the single-carrier amplitude correction signals $\Delta c_1, \Delta c_2, \Delta c_3, \Delta c_4$ is smaller since they all act in parallel with the vector of the multi-carrier amplitude correction signal $\Delta v$. Since the total power of the four distortion sources is reduced, the distortion of the reference multi-carrier signal v is reduced. The multi-carrier amplitude correction signal $\Delta v$ can be expressed as follows:

$$\Delta v(t) = \Delta c_1 \cdot h_1(t-t_0) + \Delta c_2 \cdot h_2(t-t_0) + \ldots + \Delta c_N \cdot h_N(t-t_0) = [\alpha_1 \cdot h_1(t-t_0) + \alpha_2 \cdot h_2(t-t_0) + \ldots + \alpha_N \cdot h_N(t-t_0)] \cdot \Delta v \qquad (16)$$

After the correction, a multi-carrier signal has the correct amplitude at $t_0$. Nevertheless, it is possible that new peaks will appear at a different position from $t_0$. The amplitude of these new peaks depends on the amplitude of the single-carrier amplitude correction signals used. These new peaks exhibit a smaller amplitude when the choice of single-carrier amplitude correction signals according to equation 15 is used, and, finally, the output signal has a reduced dynamic range in comparison with the known choice of single-carrier amplitude correction signals of equation 7.

The smaller the threshold value, the greater the improvement in performance. In fact, the probability that the vectors of the carrier signals $x_1, x_2, x_3, \ldots x_N$ add up with very different directions with respect to a multi-carrier signal v which is outside the target region of FIG. 23 is greater in this case.

In expression 8, the single-carrier amplitude correction signals $\Delta c_1, \Delta c_2, \ldots, \Delta c_N$ calculated by means of the present invention are modulated with pulses $h_1(.), h_2(.), \ldots, h_N(.)$ before they are added to each carrier signal. These pulses are, in one example, complex band-pass pulses with a spectrum occupancy which is similar to the carrier signals which they are intended to correct.

According to equation 15, the choice of single-carrier amplitude correction signals can also be applied for the illustrative embodiment of a correction pulse generator of FIG. 10 in which the single-carrier amplitude correction signals $\Delta c_i$ are first transposed into the baseband by the first mixers 922 which are set to a respective carrier frequency $f_i$, and the result is then modulated by means of a baseband pulse h(.). The same real pulse can be used for all carriers. The modulated signals are then again up-converted to the carrier frequency by means of the second mixers 923 which are set to the respective carrier frequency $f_i$ and take into consideration a processing time $t_0$, and added to the carrier signal. The result is shown by expression 17:

$$\begin{array}{l}(\Delta c_1 \cdot e^{-j2\pi f_1 t} \cdot h_1(t-t_0) \cdot e^{+j2\pi f_1(t-t_0)}, \quad \Delta c_2 \cdot e^{-j2\pi f_2 t} \cdot h_2 \\ (t-t_0) \cdot e^{+j2\pi f_2(t-t_0)}, \quad \ldots \quad , \quad \Delta c_N \cdot e^{-j2\pi f_N t} \cdot h_N \\ (t-t_0) \cdot e^{+j2\pi f_N(t-t_0)})\end{array} \qquad (17)$$

For calculating the single-carrier amplitude correction signals $\Delta c_1, \Delta c_2, \ldots, \Delta c_N$ according to equation 15, all coefficients $\alpha_1, \alpha_2, \ldots \alpha_N$ are set equal to 1/N in the correction distribution device 920, so that their sum is equal to 1. This method can be very easily implemented, distributes the noise power uniformly in the N carriers and can be used when all carriers have the same power.

When the carriers have different powers, the signal/noise ratio is different for every carrier. As an alternative, therefore, the coefficients $$\alpha_i = (P_i/(P_1 + P_2 + \ldots + P_N)), \, i=1 \ldots N \qquad (18)$$

can be used for calculating the single-carrier amplitude correction signals $\Delta c_i$ in the present invention in the correction distribution device 920. $P_i$ is the power associated with the carrier signal i. The coefficient $\alpha_i$, therefore, is the fraction of the total power which is associated with the carrier i. The coefficients are, in one example, precalculated when the transmission parameters are known or, as an alternative, calculated currently by estimating the power of each carrier signal.

As an alternative, the coefficients $$\alpha_i = \sqrt{P_i}/(\sqrt{P_1} + \sqrt{P_2} + \ldots + \sqrt{P_N}), \, i=1 \ldots N \qquad (19)$$

can also be used for calculating the single-carrier amplitude correction signals in the present invention in the correction distribution device 920. $P_i$ is the power associated with the carrier i. The coefficient $\alpha_i$ is, therefore, the fraction of the rms power associated with the carrier signal. The coefficients are, in one example, precalculated by the correction distribution device 920 when the transmission parameters are known or, as an alternative, currently either by estimating the power of each carrier signal or by direct estimation of the average value of each carrier signal. This method ensures an identical signal/distortion ratio between the carrier signals.

As an alternative, the coefficients $$\alpha_i = |x_i|/(|x_1| + |x_2| + \ldots + |x_N|), \, i=1 \ldots N \qquad (20),$$

which are proportional to the instantaneous amplitude of each carrier signal, can also be used for calculating the single-carrier amplitude correction signals in the present invention in the correction distribution device 920.

Figure 24:
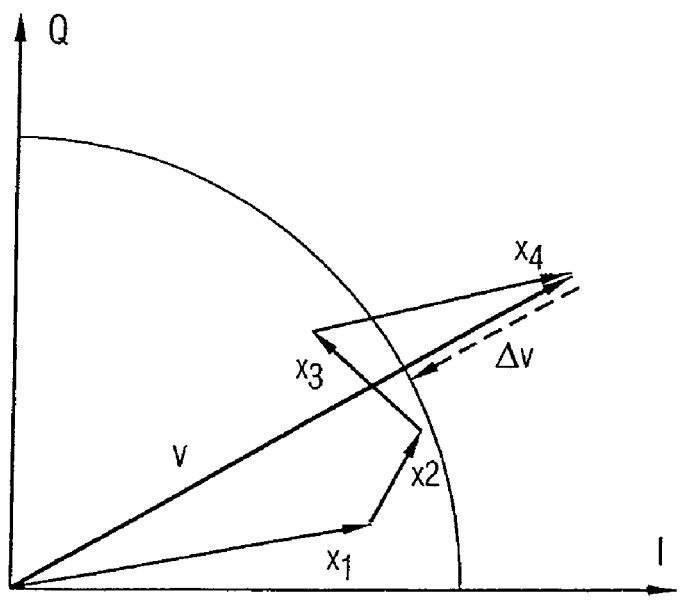
FIG. 24 shows a diagram which represents the effect of the device of FIG. 22.

As an alternative, the values $\alpha_1, \alpha_2, \ldots \alpha_N$ can also be calculated for calculating the single-carrier amplitude correction signals in the present invention in the correction distribution device 920, in such a manner that the correction performance is improved with regard to new peaks after the correction if, e.g., the carrier signal $x_3$ as shown in FIG. 24 is not corrected. In this case, the projection onto the vector of the reference multi-carrier signal v is calculated for each vector of a carrier signal $x_i$. If this projection exhibits an opposite direction to the vector of the reference multi-carrier signal v, no correction is performed on the respective carrier signal. If the projection exhibits the same direction as the vector of the reference multi-carrier signal v, the coefficient $\alpha_i$ is proportional to the amplitude of the projection. In the text which follows, a pseudo code is specified which can be used for this calculation of the coefficients $\alpha_1, \alpha_2, \ldots, \alpha_N$.

```
For i = 1 : N
  n_i = Re{x_i*conj(v)}; %calculating the projection onto v
  if (n_i < 0) then n_i = 0 %checking the direction
End
For i = 1 : N α_i = n_i/(n_1 + n_2 + ... + n_N) End %distributing
  the correction according to the projections
                          (21)
```

It should be noted that the parameters $n_i$ are an indication of the weight or, respectively, of the significance of the carrier signal $x_i$ in the peak value. If the above way of calculating the coefficients $\alpha_i$ is expanded, only a maximum number M of the parameters which are most significant for the peak is selected for the correction. The coefficients $\alpha_i$ are then calculated in accordance with the following pseudo code:

```
For i = 1 : N
  n_i = Re{x_i*conj(v)}; %calculating the projection onto v
  if (n_i < 0) then n_i = 0 %checking the direction
End
Z = {i: n_i ∋ M greatest values} %selection of the M most
significant parameters
T = sum(n_i, i ∋ Z)
For i = 1 : N
  if (i ∋ Z) then α_i = n_i/(T);
End                       (22)
```

Although the present invention is described above by means of preferred illustrative embodiments, it is not restricted to these but can be modified in many different ways.

The illustrative embodiments can be arbitrarily combined with one another in such a manner that the reduction in the dynamic range of a signal is achieved both by a prediction of the signal and by an improved correction. The signal can be both a single carrier signal and a multi-carrier signal. The invention can also be used in communication systems or transmission systems of the most different types such as e.g. wire-connected or wireless communication systems, and for many communication signals of the most different types. As an alternative to the UMTS mobile radio system, a wireless communication system is, for example, a wireless local area network (WLAN) such as, e.g., a WLAN 802.11a/g, and possible communication signals are, for example, CDMA signals, OFDM signals etc.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A device for reducing signal dynamic range for a transmitter of a communication system, the device comprising:
    an input positioned at a second point of a transmitter system that receives an input signal;
    a correction prediction device which generates a predictive signal based on the input signal which represents the prediction of the signal at the first point, generates a correction signal from the predictive signal, and has a processing time;
    a delay device which determines a selected delay according to a processing time of the correction prediction device and generates a delay input signal delayed from the input signal by the selected delay;
    an addition device wherein the correction signal is subtracted from the delayed input signal to generate a corrected signal having a reduced dynamic range; and
    an output positioned at a first point at which the corrected signal is provided.

2. The device of claim 1, wherein the input signal comprises sequences of symbols and wherein the correction prediction device comprises a number of prediction devices respectively allocated to a particular phase of each symbol within the sequences of symbols and that respectively generate predictive signals according to the particular phase.

3. The device of claim 2, wherein the correction prediction device further comprises a number of correction signal generating devices that respectively compare values of the predictive signals with threshold values and generate single-phase correction signals that collectively comprise the correction signal.

4. The device of claim 3, wherein the correction prediction device further comprises a correction combining device which combines the single-phase correction signals in order to generate the correction signal.

5. The device of claim 3, wherein the prediction devices are finite impulse response filters.

6. The device of claim 4, wherein the allocated phases of the prediction devices are equally spaced.

7. The device of claim 1, wherein the correlation prediction device comprises an interpolation filter that generates the predictive signal.

8. The device of claim 7, wherein the correlation prediction device further comprises a correlation signal generating device that compares values of the predictive signal with a threshold value and generates the correction signal according to the comparison.

9. The device of claim 1, wherein the first point is an output of a shape filter.

10. The device of claim 1, wherein the first point is an output of a mixer.

11. A device for reducing signal dynamic range for a transmitter of a mobile radio system, the device comprising:

an input to receive an input signal;
an amplitude correction signal generating device which generates an amplitude correction signal from the input signal;
a forward filter which generates a correction signal from a modified amplitude correction signal;
a feedback filter which generates an output signal from the modified amplitude correction signal, wherein the output signal represents a value of a preceding pulse of the modified amplitude correction signal;
a processing device which generates the modified amplitude correction signal from the amplitude correction signal and the output signal of the feedback filter;
a delay device which determines a delay according to processing time for the amplitude correction signal generating device, the processing device, ant the forward filter and generates a delayed input signal delayed by the delay from the input signal;
an addition device wherein the correction signal is subtracted from the delayed input signal to generate a corrected signal with a reduced dynamic range from the input signal; and
an output at which the corrected signal is output.

12. The device of claim 11, wherein the processing device sets a value of the modified amplitude correction signal to zero if a value of a preceding pulse of the correction signal is greater than a value of the amplitude correction signal and sets the value of the modified amplitude correction signal to a difference between a value of the amplitude correction signal and a value of the preceding pulse of the correction signal.

13. The device of claim 11, wherein the amplitude correction signal compares values of the input signal with a threshold value and generates the amplitude correction signal according to the comparison, wherein values of the amplitude correction signal are below the threshold value.

14. The device of claim 11, wherein the forward filter and the feedback filter are comprised of finite impulse response filters.

15. The device of claim 11, wherein the forward filter and the feedback filter are comprised of infinite impulse response filters.

16. The device of claim 11, wherein there is no overlap between pulses of the correction signal and the modified amplitude correction signal.

17. A device for reducing dynamic range of a number of carrier signals having different carrier frequencies at a point along a signal processing direction in a transmitter of a mobile radio system, the device comprising:
inputs to receive the carrier signals;
an addition device that adds the carrier signals to generate a reference multi-carrier signal;
a multi-carrier amplitude correction signal generating device which compares the reference multi-carrier signal with a threshold value and generates a multi-carrier amplitude correction signal according to the comparison, wherein values of the multi-carrier amplitude correction signal are below the threshold value;
a correction pulse generator that generates single-carrier amplitude correction signals from a multiplication of the multi-carrier amplitude correction signal by an associated coefficient and generates single-carrier correction signals for correcting the carrier signals from a multiplication of the single carrier amplitude correction signals by associated pulses;
delay devices which determines a processing delay according to processing time of the addition device, the multi-carrier amplitude correction signal generating device, and the correction pulse generator and generate carrier delayed signals from the carrier signals with the processing delay;
a plurality of addition devices which add the single-carrier correction signals to the associated delayed carrier signals to generate corrected carrier signals having a reduced dynamic range; and
outputs at which the corrected carrier signals are output.

18. The device of claim 17, wherein the coefficients are determined according to an equation $\alpha_i = 1/N$, wherein $\alpha_i$ are the coefficients, $i=1 \ldots N$, and N is a number of carrier signals.

19. The device of claim 17, wherein the coefficients are determined according to an equation $\alpha_i = P_i/(P_1+P_2+ \ldots + P_N)$, where $i=1 \ldots N$, N is a number of carrier signals, and $P_i$ is a power associated with the carrier signal i.

20. The device of claim 17, wherein the coefficients are determined according to an equation $$\alpha_i = \sqrt{P_i}/(\sqrt{P_1}+\sqrt{P_2}+ \ldots +\sqrt{P_N})$$

where $i=1 \ldots N$, N is a number of carrier signals, and $P_i$ is a power associated with the carrier signal i.

21. The device of claim 17, wherein the coefficients are determined according to an equation $\alpha_i = |x_i|/(|x_1|+|x_2|+ \ldots + |x_N|)$, where $i=1 \ldots N$, N is a number of carrier signals and $x_i$ is an amplitude of one carrier signal i.

22. The device of claim 17, wherein the coefficients are determined according to an equation $\alpha_i = n_i/(n_1+n_2+ \ldots +n_N)$ where $i=1 \ldots N$, N is a number of carrier signals and $n_i$ is a projection of a vector of a carrier signal $x_i$ onto a vector of the reference multi-carrier signal.

23. The device of claim 17, wherein the correction pulse generator comprises:
a correction distribution device that calculates the coefficients and generates the single-carrier amplitude correction signals; and
pulse generators that generate the single carrier correction signals from the multiplication of the single-carrier amplitude correction signals by the associated pulses.

24. The device of claim 23, wherein the correction pulse generator further comprises:
first mixers that down-convert the single-carrier amplitude correction signals and provide the single-carrier amplitude correction signals to the pulse generators; and
second mixers that up-convert the single-carrier correction signals according to associated carrier frequencies.

25. The device of claim 17, wherein the pulses are complex band-pass pulses with spectral characteristics similar to spectral characteristics of the carrier signals.

26. The device of claim 17, wherein the pulses are low-pass pulses with spectral characteristics similar to spectral characteristics of the carrier signals.

27. The device of claim 17, wherein the communication system is a wireless local area network.

28. The device of claim 17, wherein the communication system is a mobile radio system.

29. The device of claim 28, wherein the mobile radio system is a UMTS mobile radio system.

* * * * *